United States Patent
Nada et al.

(10) Patent No.: US 10,528,805 B2
(45) Date of Patent: Jan. 7, 2020

(54) BIOMETRIC AUTHENTICATION APPARATUS, BIOMETRIC AUTHENTICATION METHOD, AND COMPUTER-READABLE STORAGE MEDIUM

(71) Applicant: FUJITSU LIMITED, Kawasaki-shi, Kanagawa (JP)

(72) Inventors: Hajime Nada, Kawasaki (JP); Satoshi Semba, Kawasaki (JP); Soichi Hama, Atsugi (JP); Satoshi Maeda, Atsugi (JP); Takashi Morihara, Yokohama (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 96 days.

(21) Appl. No.: 15/810,848

(22) Filed: Nov. 13, 2017

(65) Prior Publication Data

US 2018/0150687 A1 May 31, 2018

(30) Foreign Application Priority Data

Nov. 30, 2016 (JP) .................. 2016-233417

(51) Int. Cl.
*G06K 9/00* (2006.01)
*G06K 9/46* (2006.01)
(Continued)

(52) U.S. Cl.
CPC ..... *G06K 9/00382* (2013.01); *G06K 9/00013* (2013.01); *G06K 9/00067* (2013.01);
(Continued)

(58) Field of Classification Search
CPC .......... G06K 9/00013; G06K 9/00067; G06K 9/00087; G06K 9/00375; G06K 9/00382;
(Continued)

(56) References Cited

U.S. PATENT DOCUMENTS

2005/0025364 A1* 2/2005 Kim ................ G06K 9/00067
382/190
2005/0148876 A1 7/2005 Endoh et al.
(Continued)

FOREIGN PATENT DOCUMENTS

JP 2006-107288 4/2006
JP 2008-090412 4/2008
(Continued)

OTHER PUBLICATIONS

EESR—Extended European Search Report dated Apr. 25, 2018 issued with respect to the corresponding European Patent Application No. 17201039.9. US2013/0308834 A1 cited in the EESR was previously submitted in the filed on Nov. 13, 2017.
(Continued)

*Primary Examiner* — Amara Abdi
(74) *Attorney, Agent, or Firm* — Fujitsu Patent Center

(57) ABSTRACT

A biometric authentication apparatus acquires biometric information of a user, extracts a boundary candidate where a state of the biometric information changes, to extract a region in a vicinity of the boundary candidate and having a threshold area or greater, extracts a state feature quantity having a value that changes according to a change in the state of the biometric information, from the extracted region, and judges the state of the biometric information using the state feature quantity of the extracted region.

14 Claims, 19 Drawing Sheets

(51) Int. Cl.
*G06T 7/11* (2017.01)
*G06F 21/32* (2013.01)

(52) U.S. Cl.
CPC ..... *G06K 9/00087* (2013.01); *G06K 9/00375* (2013.01); *G06K 9/4604* (2013.01); *G06F 21/32* (2013.01); *G06K 2009/00395* (2013.01); *G06T 7/11* (2017.01)

(58) Field of Classification Search
CPC ........ G06K 9/4604; G06K 2009/00395; G06F 21/32; G06T 7/11
See application file for complete search history.

(56) References Cited

U.S. PATENT DOCUMENTS

| | | | |
|---|---|---|---|
| 2008/0079842 A1 | 4/2008 | Aoki et al. | |
| 2010/0127827 A1 | 5/2010 | Watanabe | |
| 2012/0068917 A1* | 3/2012 | Huang | G06F 3/017 345/156 |
| 2013/0308834 A1 | 11/2013 | Suzuki et al. | |
| 2014/0286528 A1* | 9/2014 | Endoh | G06K 9/00067 382/103 |
| 2016/0373438 A1* | 12/2016 | Yoon | H04L 63/0861 |

FOREIGN PATENT DOCUMENTS

| | | |
|---|---|---|
| WO | 2004021884 | 3/2004 |
| WO | 2012111664 | 8/2012 |
| WO | 2013005305 | 1/2013 |

OTHER PUBLICATIONS

David D. Zhang, "Palmprint Segmentation by Key Point Features", Springer, Chapter 6, 2004 pp. 73-83, (6 pages).

Akihiro Shimada et al., "Analysis of Friction Characteristics on Human Fingers", Transactions of the Society of Instrument and Control Engineers, vol. 32, No. 12, pp. 1581-1587 (1996), (7 pages) with English Abstract.

Takashi Maeno et al., "Analysis on Geometry of Human Epidermal Ridges", Transactions of the Japan Society of Mechanical Engineers (Series C), vol. 71, No. 701, pp. 245-250 (2005), with English Abstract.

\* cited by examiner

FINGERTIP DIRECTION ↑

FINGERTIP DIRECTION ↑

FINGERTIP DIRECTION

| ATTRIBUTE INFORMATION | | FEATURE DATA OF PALM IMAGE |
|---|---|---|
| ID | USER NAME | |
| 0001 | xxxx | $H_1$ |
| 0002 | yyyy | $H_2$ |
| ⋮ | | |
| 000n | zzzz | $H_n$ |

FINGERTIP DIRECTION

BIOMETRIC AUTHENTICATION APPARATUS, BIOMETRIC AUTHENTICATION METHOD, AND COMPUTER-READABLE STORAGE MEDIUM

CROSS-REFERENCE TO RELATED APPLICATIONS

This application is based upon and claims the benefit of priority of the prior Japanese Patent Application No. 2016-233417, filed on Nov. 30, 2016, the entire contents of which are incorporated herein by reference.

FIELD

The embodiments discussed herein are related to a biometric authentication apparatus, a biometric authentication method, and a computer-readable storage medium.

BACKGROUND

Biometric authentication is a technique for identity verification using biometric information such as a fingerprint, face, vein, or the like. Biometric information that is registered in advance, and biometric information that is acquired from a person when confirmation is required are compared (or collated), and identity of this person is verified when the compared biometric information match. For example, biometric authentication using a palm-print pattern, a palm shape (or lines of the palm), a palm vein pattern, or the like is employed in terminals including laptop PCs (Personal Computers), tablets, smartphones, or the like.

In the biometric authentication apparatus that uses an image of the palm (hereinafter also referred to as "a palm image") such as the palm-print pattern, the palm shape, and the palm vein pattern, or the like, as the biometric information, an area that is captured and an image that is captured greatly differ between a case in which the palm is captured in an open (or flat) state and a case in which the palm is captured in a closed (or rounded) state. When the open or closed state of the palm differs between a time when the palm is registered and a time when the palm is captured for identity verification, an authentication accuracy deteriorates. Consequently, a false rejection rate may increase due to erroneous authentication. For this reason, it is desirable to judge whether the palm is open or closed, when registering the palm and when capturing the palm for identity verification. Various techniques have been proposed to judge the open or closed state of the palm.

According to a first example, the open or closed state of the palm is judged from a ratio of a vertical length and a horizontal length of the image of the entire hand that is captured. This first example is proposed in International Publication Pamphlet No. WO2004/021884, for example. In addition, a second example utilizes for the authentication, gesture images that are obtained by changing the open or closed state of the palm. This second example is proposed in Japanese Laid-Open Publication No. 2008-90412, for example. According to this second example, the entire hand is captured at each gesture state when registering the image of the hand, and the image of the hand that is captured when making the authentication is matched against the registered images of the hand, to judge the gesture state of the captured image of the hand.

The biometric authentication apparatus that uses the palm image efficiently captures the palm with a high picture quality. For this reason, as described in David D. Zhang, "Palmprint Authentication", Springer, Chapter 6, pp. 73-83, 2004, for example, popularly employed systems utilize for the authentication the palm image that is captured in the state in which the palm is open.

However, in the case of the first example, it is a precondition that the entire hand is captured. Hence, it is impossible to obtain the ratio between the vertical length and the horizontal length of the image of the entire hand, from the palm image corresponding to a part of the entire hand. For this reason, according to the first example, it is difficult to accurate judge the open or closed state of the palm from the palm image corresponding to a part of the entire hand. On the other hand, in the case of the second example, if a number of kinds of gesture images that are registered in advance is limited, it is difficult to accurately judge the open or closed state of the palm by matching the gesture images.

Accordingly, it is conventionally difficult to accurately judge the biometric state.

Other examples of related art include International Publication Pamphlet No. WO2012/111664, International Publication Pamphlet No. WO2013/005305, Japanese Laid-Open Patent Publication No. 2006-107288, David D. Zhang, "Palmprint Authentication", Springer, Chapter 6, pp. 73-83, 2004, Akihiro Shimada et al., "Analysis of Friction Characteristics on Human Fingers", Transactions of the Society of Instrument and Control Engineers, Vol. 32, No. 12, pp. 1581-1587, 1996, and Takashi Maeno et al., "Analysis on Geometry of Human Epidermal Ridges", Transactions of the Japan Society of Mechanical Engineers (Series C), Vol. 71, No. 701, pp. 245-250, 2005, for example.

SUMMARY

Accordingly, it is an object in one aspect of the embodiments to provide a biometric authentication apparatus, a biometric authentication method, and a computer-readable storage medium, which can accurately judge the biometric state.

According to one aspect of the embodiments, a biometric authentication apparatus includes a memory configured to store a program, and a processor configured to execute the program to perform a process including acquiring biometric information of a user, extracting a boundary candidate where a state of the biometric information changes, to extract a region in a vicinity of the boundary candidate and having a threshold area or greater, extracting a state feature quantity having a value that changes according to a change in the state of the biometric information, from the extracted region, and judging the state of the biometric information using the state feature quantity of the extracted region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

A biometric authentication apparatus, a biometric authentication method, and a computer-readable storage medium disclosed herein acquires biometric information of a user, extracts a boundary candidate where a state of biometric information changes, and extracts a region in a vicinity of the boundary candidate and having a threshold area or greater. A state feature quantity having a value that changes according to a change in the state of the biometric information is extracted from the extracted region, and a biometric state is judged using the state feature quantity of the extracted region.

A description will now be given of the biometric authentication apparatus, the biometric authentication method, and the computer-readable storage medium in each embodiment according to the present invention.

In the biometric authentication apparatus in one embodiment, biometric authentication is performed using a biometric image that is captured. For the sake of convenience, an example will be described in which the biometric image is a palm image, and palm authentication is performed using a palm-print, a palm shape, a palm vein, or the like of the palm. In addition, in order to efficiently capture the palm image with a high picture quality, the biometric authentication apparatus utilizes for the palm authentication the palm image that is captured in the open state of the palm. For this reason, when the palm image is acquired, a judgement is made to determine whether the palm is in the open or closed state.

Figure 1:
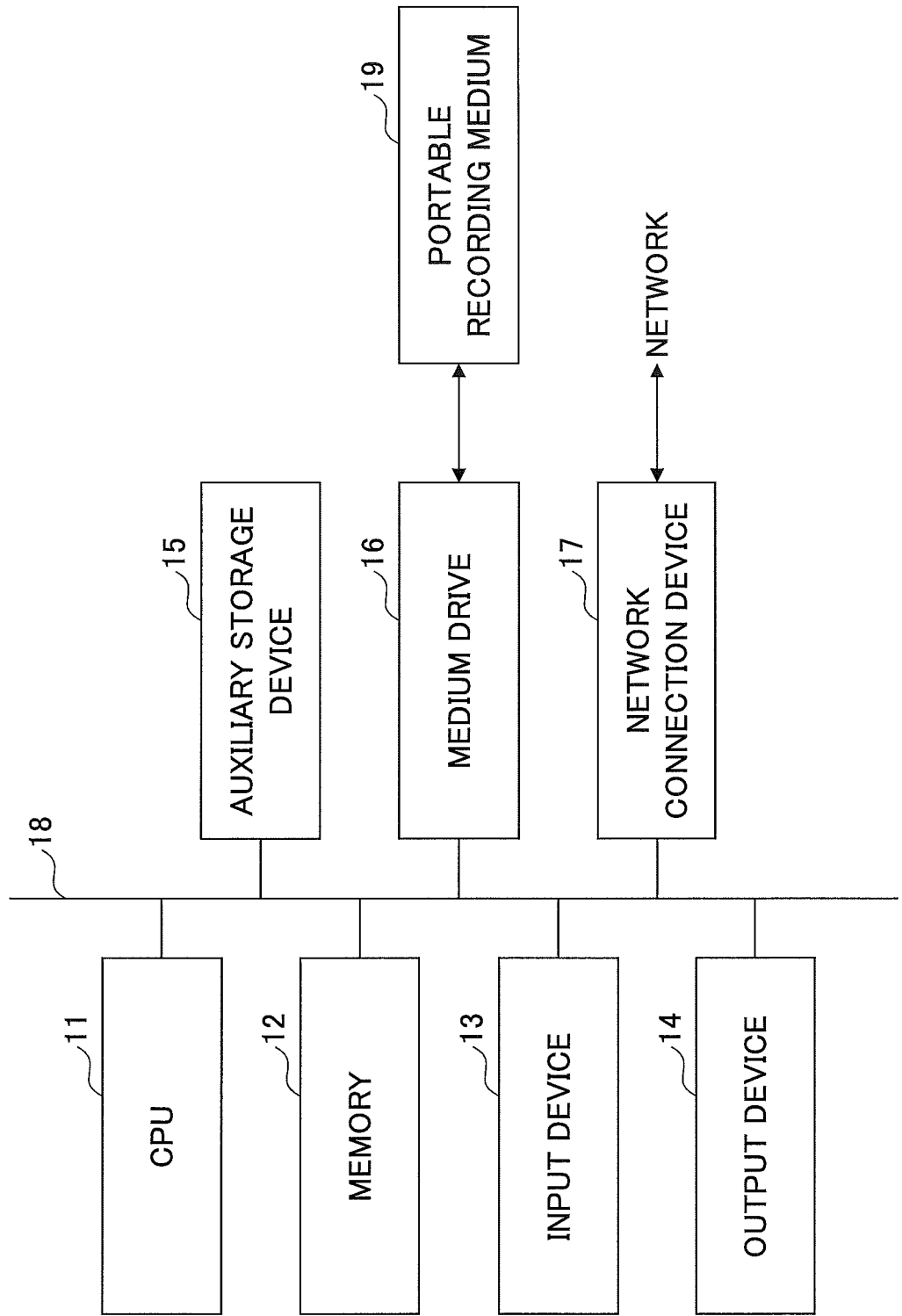
FIG. 1 is a block diagram illustrating an example of a hardware configuration of a biometric authentication apparatus in one embodiment.

FIG. 1 is a block diagram illustrating an example of a hardware configuration of a biometric authentication apparatus in one embodiment. A computer 1 illustrated in FIG. 1 includes a CPU (Central Processing Unit) 11, a memory 12, an input device 13, an output device 14, an auxiliary storage device 15, a medium drive 16, and a network connection device 17 that are mutually connected via a bus 18. The network connection device 17 is connectable to a communication network which may be a cable network, a wireless network, or a combination of a cable network and a wireless network.

The memory 12 may be formed by a semiconductor memory, such as a ROM (Read Only Memory), a RAM (Random Access Memory), a flash memory, or the like, for example. The memory 12 may store one or more programs and data that are used when performing a process (hereinafter also referred to as "an open or closed state judging process") to judge the open or closed state of the palm, as an example of the biometric state, a biometric authentication process, or the like. The memory 12 may form a storage device that will be described later.

The CPU 11 is an example of a processor that executes one or more programs stored in the memory 12, for example. The CPU 11 may execute the one or more programs to perform functions of an authentication unit 23 of a biometric authentication apparatus 2 illustrated in FIG. 8 that will be described later.

The input device 13 may be formed by a capturing device capable of capturing various biometric information including the palm image of the user, and input equipment used by an operator or the user to input instructions, information including attribute information of the user, or the like to the computer 1. The capturing device may be a camera, a sensor, or the like, for example. The input equipment may be a keyboard, a pointing device, a microphone, a card reader, or the like, for example. The input device 13 may include a light source of the capturing device, and the light source may include an infrared lamp that is used when capturing the palm vein, for example. The output device 14 may be formed by a display device, a printer, a speaker, or the like, for example. The output device 14 may be used to output inquiries, instructions, processed results, or the like with respect to the operator or the user. The processed results may include a judgment result of the open or closed state judging process, an authentication result of the biometric authentication process, or the like. The capturing device of the input device 13 may be separate from the computer 1, and be externally connected to the computer 1. In this case, the capturing device may be connected to the bus 18, or be connected to the network connection device 17 via the communication network.

The auxiliary storage device 15 may be formed by a magnetic disk drive, an optical disk drive, a magneto-optical disk drive, a tape drive, or the like, for example. The auxiliary storage device 15 may also be formed by a hard disk drive, a flash memory, or the like, for example. The computer 1 may store the one or more programs and the data in the auxiliary storage device 15, and load the one or more programs and the data to the memory 12 when executing the one or more programs, for example. The auxiliary storage device 15 may form the storage device that will be described later.

The medium drive 16 may drive a portable recording medium 19, and make access to stored contents of the portable recording medium 19. The portable recording medium 19 may be formed by a memory device, a flexible disk, an optical disk, a magneto-optical disk, or the like, for example. The portable recording medium 19 may also be formed by a CD-ROM (Compact Disk-Read Only Memory), a DVD (Digital Versatile Disk), a USB (Universal Serial Bus) memory, or the like, for example. The operator or the user may store the one or more programs and the data in the portable recording medium 19, and load the one or more programs and the data to the memory 12 when executing the one or more programs, for example. The portable recording medium 19 may form the storage device that will be described later.

A computer-readable storage medium which stores the one or more programs and the data that are used when performing the open or closed state judging process or the biometric authentication process, or the open or closed state judging process and the biometric authentication process, is a non-transitory recording medium, such as the memory 12, the auxiliary storage device 15, and the portable recording medium 19.

The network connection device 17 is an example of a communication interface that is connectable to a communication network, such as a LAN (Local Area Network), a WAN (Wide Area Network), or the like, and perform a data conversion associated with the communication. The computer 1 may receive the one or more programs and the data from an external apparatus via the network connection device 17, and load the one or more programs and the data to the memory 12 when executing the one or more programs, for example.

The computer 1 may receive a process request from a user terminal via the network connection device 17, and perform at least one of the open or closed state judging process and the biometric authentication process. In addition, the computer 1 may send the processed result of the at least one of the open or closed state judging process and the biometric authentication process to the user terminal via the network connection device 17.

The computer 1 does not require all of the constituent elements illustrated in FIG. 1, and some of the constituent elements may be omitted according to the usage, conditions, or the like of the computer 1. For example, in a case in which the computer 1 receives the process request from the user terminal via the communication network, the input device 13 and the output device 14 may be omitted. Further, in a case in which the portable recording medium 19 or the communication network is not used, the medium drive 16 or the network connection device 17 may be omitted.

In a case in which the computer 1 is a portable terminal having a communication function, such as a smartphone, for example, the input device 13 and the output device 14 of the computer 1 may include devices for performing the communication function, such as a microphone and a speaker, and the input device 13 may also include an imaging device such as a camera. Further, the input equipment of the input device 13 and the display device of the output device 14 may be formed by a touchscreen panel that integrally includes the input equipment and the display device.

Figure 2:
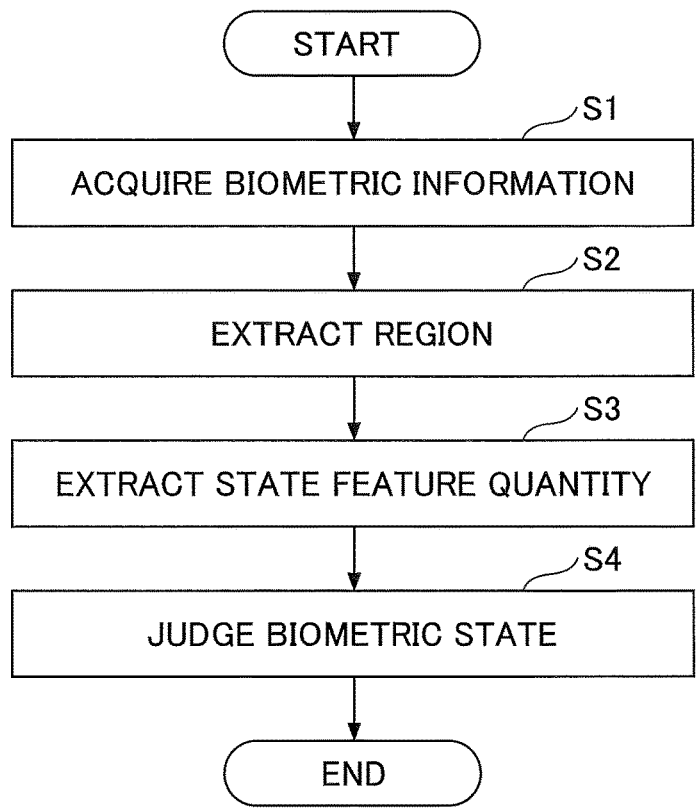
FIG. 2 is a flow chart for explaining an example of a biometric state judging process in one embodiment.

FIG. 2 is a flow chart for explaining an example of a biometric state judging process in one embodiment. In the case in which the biometric information is the palm image, the open or closed state judging process is performed as an example of the biometric state judging process.

In step S1 illustrated in FIG. 2, the input device 13 illustrated in FIG. 1 acquires biometric information that is input, such as the palm image used for the biometric authentication. In step S2, the CPU 11 illustrated in FIG. 1 extracts a boundary candidate where a state of the biometric information changes, and extracts a region in a vicinity of the boundary candidate and having a threshold area or greater. In the case in which the biometric information is the palm image, the boundary where the state of the biometric information changes refers to line information having certain properties in a state in which fingers of a user's hand are bent and the palm of the same hand is in the closed state. The line information having the certain properties include contour lines of the fingers located in front of the palm, wrinkles of the fingers, contour lines of nails, a heart line, a head line, and a life line of the palm, or the like. In step S3, the CPU 11 extracts a state feature quantity having a value that changes according to a change in the state of the biometric information, from the extracted region. In the case in which the biometric information is the palm image, the state feature quantity refers to information indicating differences in biometric features of the skin at the palm and at the back of the fingers. In step S4, the CPU 11 judges the biometric state using the state feature quantity of the extracted region. In the case in which the biometric information is the palm image, the biometric state refers to the open or closed state of the palm.

Figure 3:
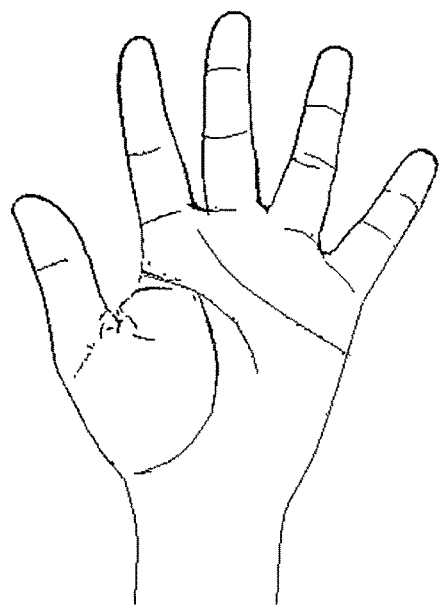
FIG. 3 is a diagram illustrating an example of an open state of a palm.
Figure 4:
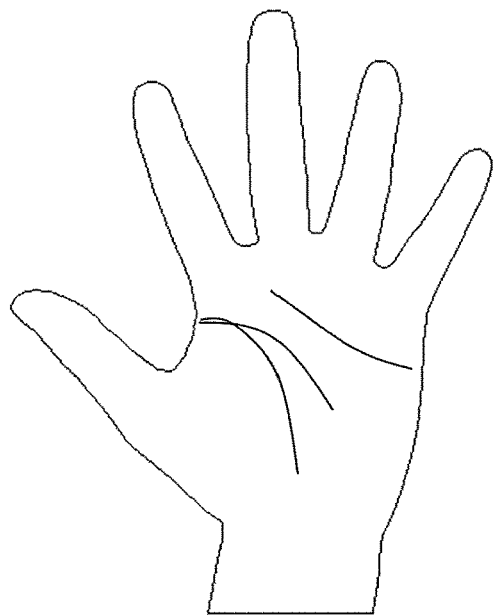
FIG. 4 is a diagram illustrating an example of a palm-print.
Figure 5:
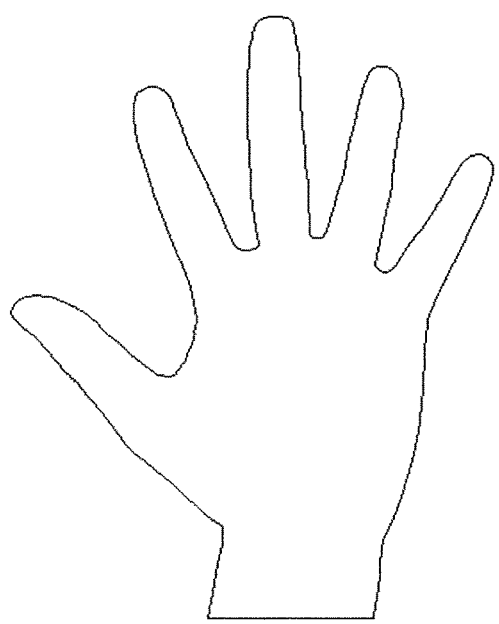
FIG. 5 is a diagram illustrating an example of a palm shape.
Figure 6:
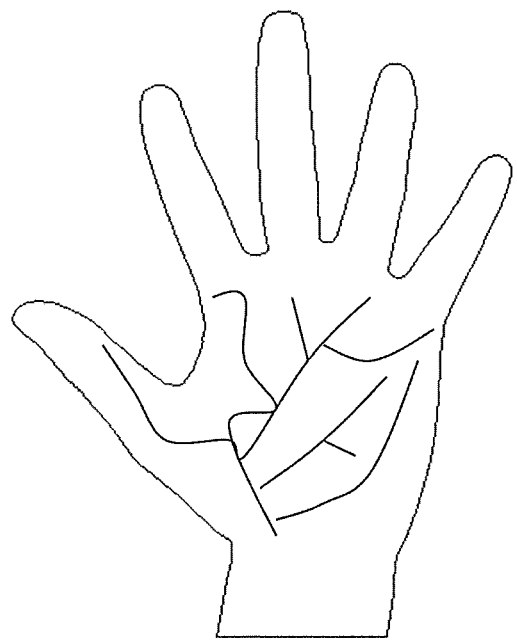
FIG. 6 is a diagram illustrating an example of a palm vein.

In the case in which the biometric information is the palm image and the judgment result of the open or closed state of the palm indicates that the palm is in the open state as illustrated in FIG. 3, the palm authentication process, that is an example of the biometric authentication process, compares (or collates) the palm image of the user acquired by the input device 13 in step S1 and the palm image registered in advance. In a case in which the compared (or collated) palm images match, it is judged that the user is the same user who registered the palm image in advance. The palm authentication process verifies the identity of the user using the palm images such as a palm-print illustrated in FIG. 4, a palm shape illustrated in FIG. 5, a palm vein illustrated in FIG. 6, or the like. The process itself of comparing (or collating) the palm image acquired at the time of the authentication and the palm image registered in advance is known, and biometric features of the palm image may be compared (or collated), for example. The biometric features refer to features of the biometric information.

Figure 7:
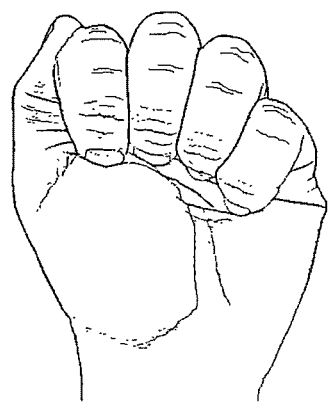
FIG. 7 is a diagram illustrating an example of a closed state of the palm.

On the other hand, in the case in which the biometric information is the palm image and the judgment result of the open or closed state of the palm indicates that the palm is in the closed state as illustrated in FIG. 7, the palm authentication process urges the user to open the palm, for example. When urging the user to open the palm, it is possible to display a message (or instruction) on the display device of the output device 14, output a voice message (or instruction) from the speaker of the output device 14, or the like. The message (or instruction) that urges the user to open the palm is an example of a message (or instruction) that urges the user to input biometric information appropriate for the authentication. In response to the message that urges the user to open the palm, the user can input the biometric information that is appropriate for the authentication by recapturing the palm image by the imaging device of the input device 13 in a state in which the palm is more open than the palm at the time when the palm image was previously captured. Accordingly, in step S1, the imaging device of the input device 1 can acquire the palm image that is appropriate for the authentication, in the open state of the palm. As a result, the authentication accuracy improves, and it is possible to reduce the erroneous authentication and reduce the false rejection rate.

At the time of registration when the palm image is registered, it is possible to register the palm image appropriate for the authentication by performing an open or closed state judging process similar to the above described open or closed state judging process that is performed at the time of authentication.

When capturing the palm image at the time of registration and at the time of authentication, the palm image may be captured using a known guide member (not illustrated) that guides the palm, or without using such a guide member. In the case in which the palm image is captured using the guide member, the palm can be maintained in a horizontal state when the user places the user's palm on the guide member.

Figure 8:
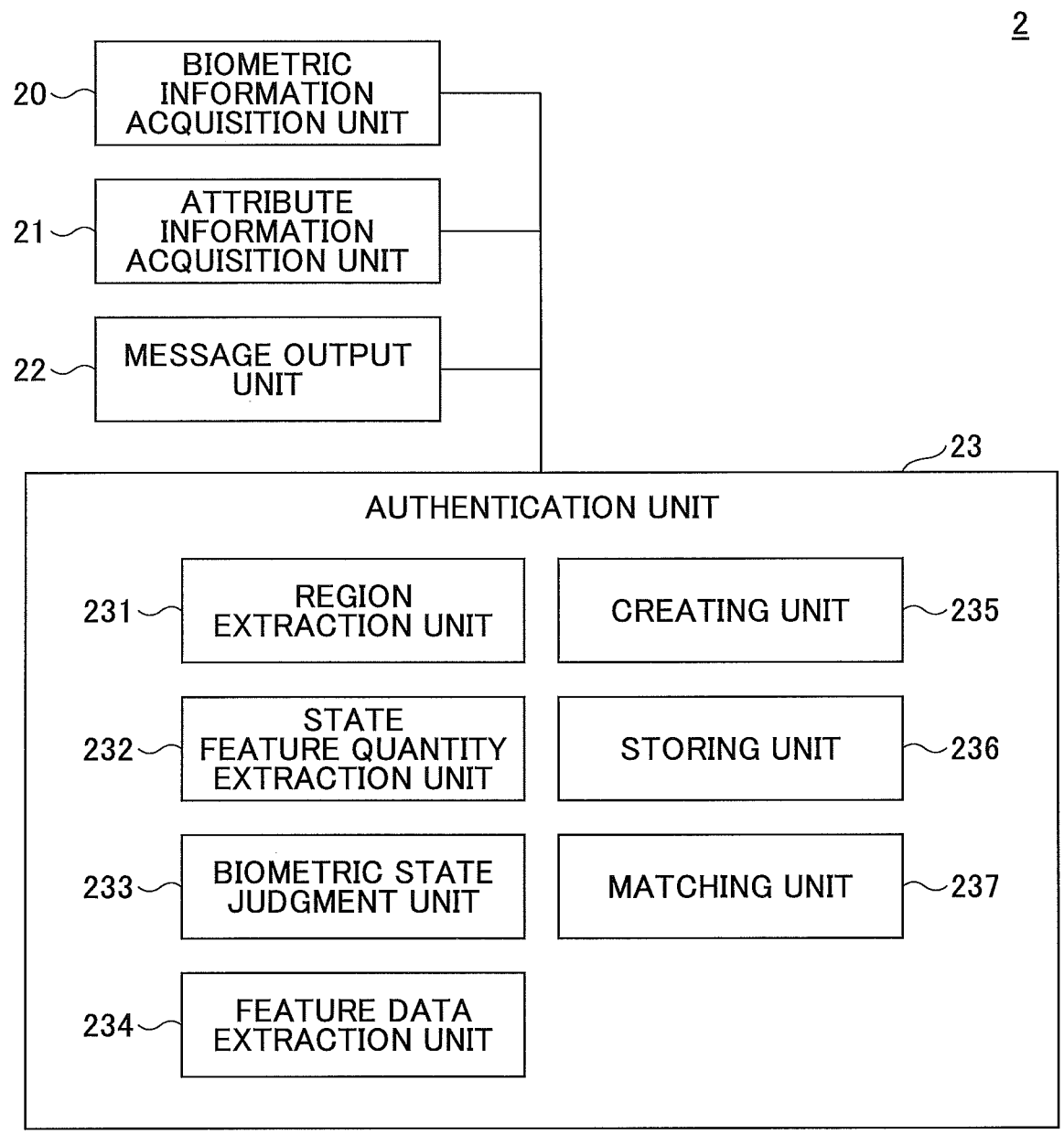
FIG. 8 is a functional block diagram illustrating an example of the biometric authentication apparatus in one embodiment.

FIG. 8 is a functional block diagram illustrating an example of the biometric authentication apparatus in one embodiment. The biometric authentication apparatus 2 illustrated in FIG. 8 includes a biometric information acquisition unit 20, an attribute information acquisition unit 21, a message output unit 22, and an authentication unit 23.

Figure 9:
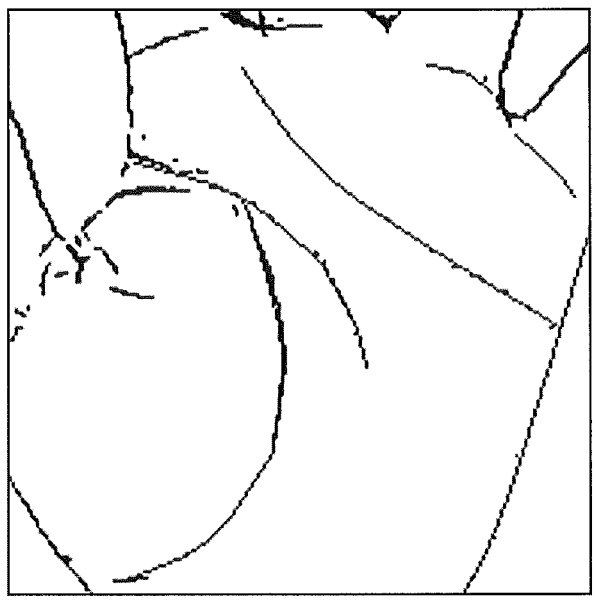
FIG. 9 is a diagram illustrating an example of an image of an entire palm that is captured in the open state of the palm.
Figure 10:
FIG. 10 is a diagram illustrating an example of a partial image of the palm that is captured in the open state of the palm.
Figure 11:
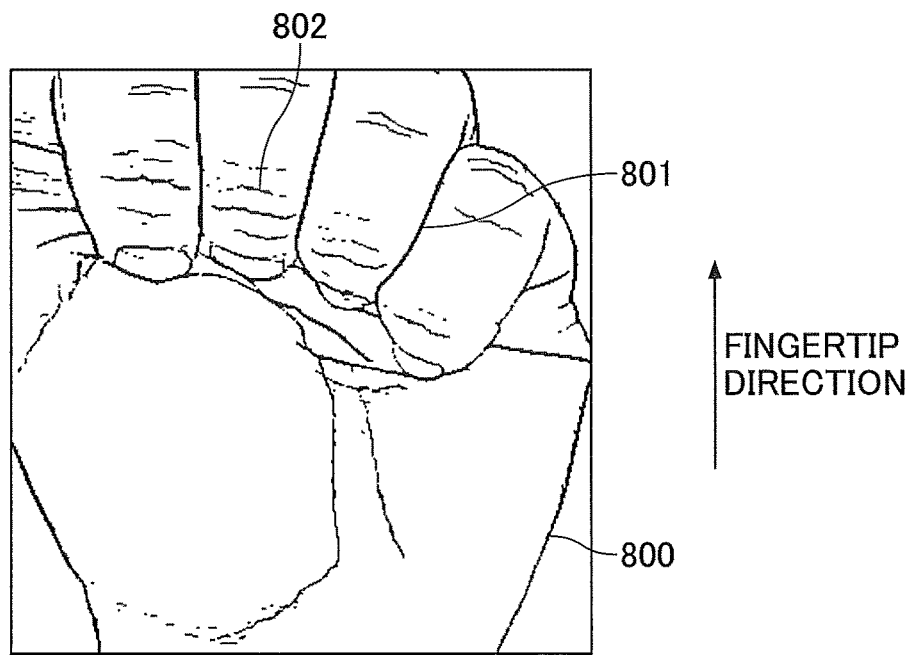
FIG. 11 is a diagram illustrating an example of an image of the entire palm that is captured in the closed state of the palm.

The biometric information acquisition unit 20 is an example of a first acquisition unit that acquires the biometric information, and may be formed by the imaging apparatus such as the camera, the sensor, or the like of the input device 13 that acquires the biometric information, such as the palm image. The palm image may be a color image or a monochromatic image. In addition, the palm image includes the palm-print illustrated in FIG. 4, the palm shape illustrated in FIG. 5, the palm vein illustrated in FIG. 6, or the like. The image of the palm vein includes information of visible light, and palm wrinkles may be extracted from the image of the palm vein. In order to efficiently capture the palm with a high image quality, the palm image in this example is captured in the open state of the palm by capturing the entire palm as illustrated in FIG. 9. FIG. 9 is a diagram illustrating an example of the image of the entire palm that is captured in the open state of the palm. However, the palm image may be a partial image of the palm that is captured in the open state of the palm by capturing a part of the palm as illustrated in FIG. 10. FIG. 10 is a diagram illustrating an example of the partial image of the palm that is captured in the open state of the palm. In each of the embodiments described hereinafter, the palm image may be the image of the entire palm that is captured, or the partial image of the palm that is captured. For the sake of convenience, in each of the embodiments described hereinafter, unless specifically indicated, the palm image that is an example of the biometric information is the palm-print illustrated in FIG. 9. FIG. 11 is a diagram illustrating an example of an image of the entire palm that is captured in the closed state of the palm, for comparison purposes.

The attribute information acquisition unit 21 is an example of a second acquisition unit that acquires the attribute information of the user, and may be formed by the input device for inputting attribute information of the user, such as the keyboard, the pointing device, the microphone, the card reader, or the like. The attribute information of the user may be used to improve security by verifying the identity of the user at the time of the registration of the biometric information such as the palm image, or at the time of the registration and at the time of authentication. The attribute information includes a user ID (Identification), a user name, password, or the like, for example. The keyboard and the pointing device may be operated by the user when the user inputs the user's attribute information to the authentication unit 23. The microphone may be used by the user when the user inputs the user's attribute information by voice to the authentication unit 23. The card reader may be used by the user when the user inputs the user's attribute information by reading the user's attribute information from an IC (Integrated Circuit) card, an RFID (Radio Frequency Identification) tag, or the like.

At the time of the authentication, it is possible not to input the attribute information. In this case in which the attribute information is not input at the time of the authentication, a similarity may be computed by comparing (or collating) authentication data created at the time of the authentication with all of registration data that are registered in advance (or prestored). In this case, the user corresponding to the registration data having the highest similarity to the authentication data created at the time of the authentication, among the computed similarities, is identified as the user who attempted the authentication. The user is then authenticated to verify the identity of the user.

The message output unit 22 is an example of an output unit that outputs the message or the like, and may be formed by the display device, the speaker, or the like of the output device 14 that outputs the message or the like to the user. The message output unit 22 may also produce a voice output from the speaker of the output device 14, simultaneously as displaying the message on the display device of the output device 14.

In this example, the authentication unit 23 performs the biometric state judging process and the biometric authentication process. The authentication unit 23 includes a region extraction unit 231, a state feature quantity extraction unit 232, a biometric state judgment unit 233, a feature data extraction unit 234, a creating unit 235, a storing unit 236, and a matching unit 237. The CPU 11 illustrated in FIG. 1 can execute the program stored in the storage device such as the memory 12, for example, and operate as and perform functions of the region extraction unit 231, the state feature quantity extraction unit 232, the biometric state judgment unit 233, the feature data extraction unit 234, the creating unit 235, the storing unit 236, and the matching unit 237.

The region extraction unit 231 is an example of a first extraction unit that extracts a boundary candidate where a state of the biometric information changes, and extracts a region in a vicinity of the boundary candidate and having a threshold area or greater. In the case in which the biometric information is the palm image, the boundary candidate where the state of the biometric information changes refers to the line information having the properties of the contour lines of the fingers located in front of the palm as illustrated in FIG. 11 in the state in which the fingers are bent and the palm is in the closed state, for example. FIG. 11 is a diagram illustrating the example of the image of the entire palm that is captured in the closed state of the palm. In FIG. 11, an arrow indicates a fingertip direction of a hand 800, a reference numeral 801 indicates the contour lines of the fingers, and a reference numeral 802 indicates wrinkles of the fingers.

Figure 12:
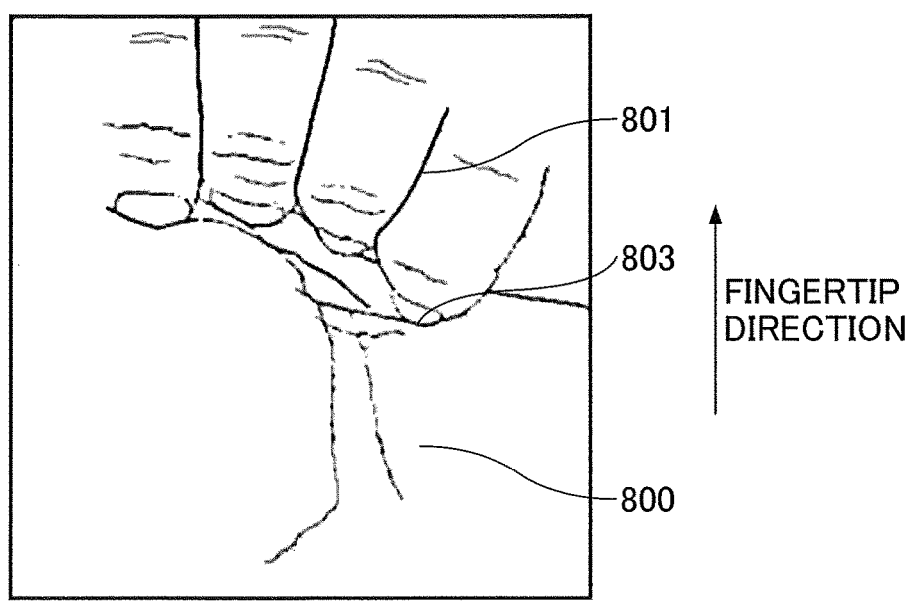
FIG. 12 is a diagram illustrating an example of an image of the partial image of the palm that is captured in the closed state of the palm.

For example, the region extraction unit 231 extracts the line information (or edge), such as the palm-print, the palm shape, the palm vein, or the like from the palm image, using an edge extraction filter such as a Sobel filter or the like. In the case in which the palm image is input in the closed state of the palm, the contour lines 801 of the fingers are extracted together with the line information, as illustrated in FIG. 12. FIG. 12 is a diagram illustrating an example of an image of the partial image of the palm that is captured in the closed state of the palm. In FIG. 12, a reference numeral 803 indicates the contour lines of the nails.

Figure 13:
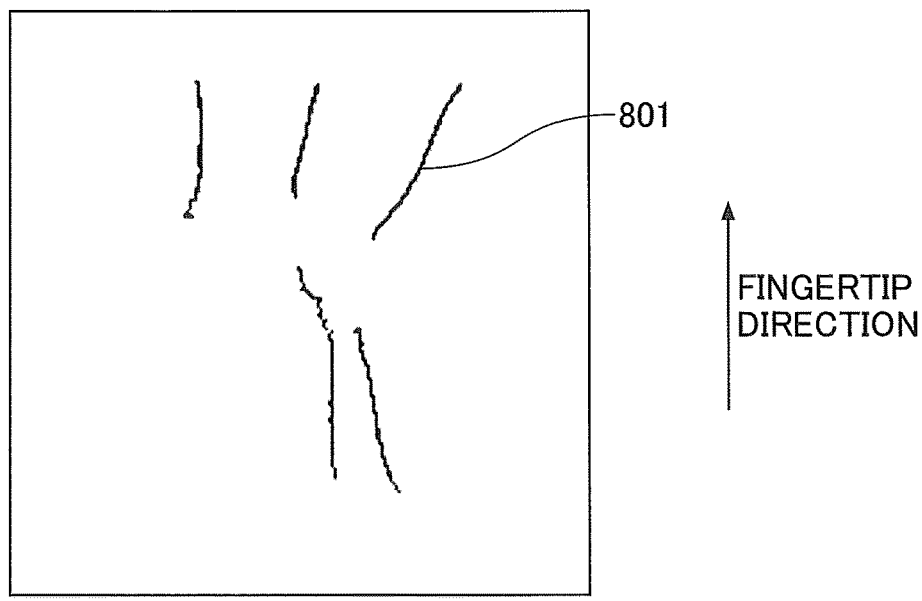
FIG. 13 is a diagram illustrating an example of a boundary candidate that is extracted by a region extraction unit.

In addition, the region extraction unit 231 selects, from the line information, line information having the properties of the contour lines 801 of the fingers, as a boundary candidate 804. For example, the region extraction unit 231 can select the contour lines 801 of the fingers illustrated in FIG. 13, that are examples of the boundary candidate, using information indicating the properties of the contour lines 801 of the fingers. The properties of the contour lines 801 of the fingers may indicate that the contour lines 801 of the fingers are approximately parallel to the fingertip direction that is determined from a capture area of the imaging device of the input device 13, and that the contour lines 801 of the fingers after the edge extraction appear relatively, more conspicuously when compared to the palm-print, the palm shape, the palm vein, or the like after the edge extraction. FIG. 13 is a diagram illustrating an example of the boundary candidate that is extracted by the region extraction unit.

The region extraction unit 231 extracts the region in the vicinity of the boundary candidate and having the threshold area or greater. The region having the threshold area or greater covers a portion of the fingers, for example, and is a rectangular region within the palm image. For example, this rectangular region has a long side that may be 2 cm to 3 cm or longer, and a short side that may be 1 cm to 2 cm or longer. The threshold area may be computed from [long side of rectangular region (cm)]×[resolution of palm image (dots/cm)]×[short side of rectangular region (cm)]×[resolution of palm image (dots/cm)].

Figure 14:
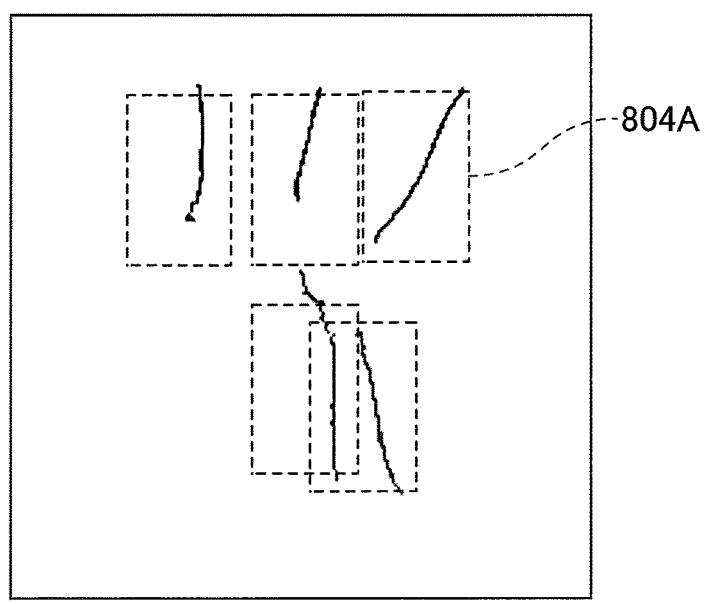
FIG. 14 is a diagram illustrating an example of a rectangular region selected by the region extraction unit.

As indicated within rectangular boxes represented by a dotted line in FIG. 14, the region extraction unit 231 may extract a rectangular region 804A containing the boundary candidate at a center thereof. FIG. 14 is a diagram illustrating an example of the rectangular region selected by the region extraction unit.

Figures 15, 16:
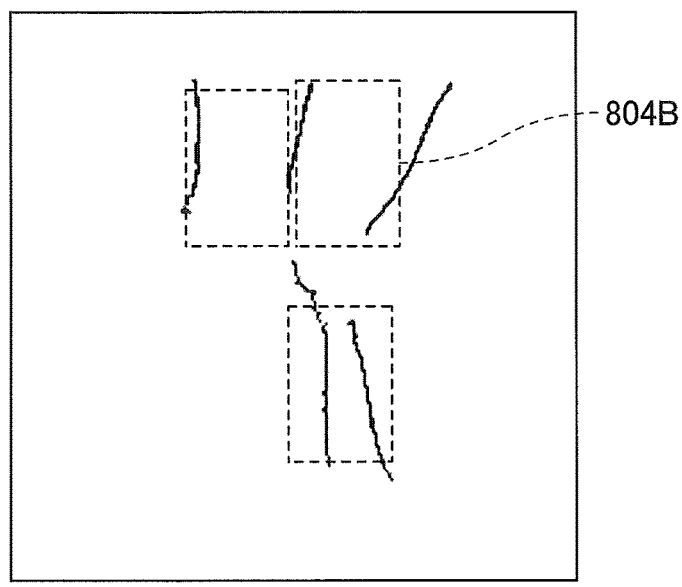
FIG. 15 is a diagram illustrating another example of the rectangular region selected by the region extraction unit.
FIG. 16 is a diagram illustrating an example of a structure of registration data.

As indicated within rectangular boxes represented by a dotted line in FIG. 15, in a case in which a plurality of boundary candidates are extracted, the region extraction unit 231 may extract a rectangular region 804B at a center of a region surrounded by the plurality of boundary candidates. FIG. 15 is a diagram illustrating another example of the rectangular region selected by the region extraction unit. By extracting the rectangular region 804B surrounded by the plurality of boundary candidates, the region is formed by an area of a specific state of the biometric information, and it is possible to obtain an effect of stabilizing a value of the state feature quantity that will be described later.

Further, in a case in which the palm image is input in the closed state of the palm, the region extraction unit 231 may extract a region limited towards the fingertip direction of the palm image, because the back of the fingers is located towards the fingertip direction of the palm image.

In a biometric authentication apparatus in which the fingertip direction cannot be determined to a specific direction, a plurality of directions may be defined as fingertip direction candidates. In this case, the region extraction unit 231 may extract the boundary candidate and the region for every fingertip direction candidate.

The state feature quantity extraction unit 232 is an example of a second extraction unit that extracts the state feature quantity having a value that changes according to a change in the state of the biometric information, from the extracted region. In this example, the state feature quantity is used when judging the open or closed state of the palm. For this reason, the state feature quantity is information indicating differences in biometric features of the skin on the palm side and the skin on the back side of the fingers.

For example, the differences in the biometric features include types or the like of the line information. The line information, such as wrinkles, palm-print, palm vein, fingerprint or the like exist on the palm side. In addition, the line information includes various kinds of lines, from thick (or wide) lines to thin (narrow) lines, and from long lines to short lines. It is known from Akihiro Shimada et al., "Analysis of Friction Characteristics on Human Fingers", Transactions of the Society of Instrument and Control Engineers, Vol. 32, No. 12, pp. 1581-1587, 1996, and Takashi Maeno et al., "Analysis on Geometry of Human Epidermal Ridges", Transactions of the Japan Society of Mechanical Engineers (Series C), Vol. 71, No. 701, pp. 245-250, 2005, for example, that the thin lines prevent slipping when an object is held by the hand, and that the thin lines have a width of approximately 0.5 mm. In addition, there are lines existing at specific location of the hand, such as the life line or the like of the palm. Basically, there are differences in line information among individuals, and distributions of the line information are non-uniform among the individuals.

On the other hand, the line information, such as the wrinkles, the vein, or the like exist on the back side of the fingers. The wrinkles include the wrinkles 802 of the fingers that are generated by the bending of the fingers when closing the palm. The wrinkles 802 of the fingers include a large number of wrinkles, that is, components, extending perpendicularly to the fingertip direction.

Hence, in this example, differences in the line information perpendicular to the fingertip direction are used as an example of the differences in the biometric features of the skin on the palm side and the skin on the back side of the fingers. The state feature quantity extraction unit 232 extracts, as the state feature quantity, a ratio (or proportion) of pixels of the line information perpendicular to the fingertip direction, occupying the region, with respect to pixels within the region. Of course, the state feature quantity may be a number of line information perpendicular to the fingertip direction.

The biometric state judgment unit 233 is an example of a judgment unit that judges the state of the biometric information using the state feature quantity of the extracted region. For example, in a case in which at least one or more state feature quantities greater than or equal to a threshold value exist, the biometric state judgment unit 233 judges that a region corresponding to the back side of the fingers exists within the biometric information, and judges that the palm is in the closed state in which the fingers are bent. In this case, the biometric authentication apparatus outputs a message urging the user to open the palm and input the palm image, and the user performs a process to reinput the palm image in response to the message.

On the other hand, in a case in which only state feature quantities less than the threshold value exist, the biometric state judgment unit 233 judges that only the region corresponding to the palm side exists, and judges that the palm is in the open state. In this case, the biometric authentication apparatus thereafter performs processes such as feature extraction, registration, authentication, or the like.

In a case in which the state feature quantity is the ratio of pixels, the threshold value that is used may be a value in a range of 2% to 6%, for example. In addition, in a case in which the state feature quantity is the number of line information, the threshold value that is used may be a value in a range of 1 to 6.

In the case in which the biometric information input by the user is the palm image, the feature data extraction unit 234 is an example of a third extraction unit that extracts feature data of the palm image used for matching. In the case in which the biometric information is the palm-print, the feature data includes a palm-print pattern formed by large and small wrinkles on the surface of the palm, frequency information of the palm-print, or the like. In addition, in the case in which the biometric information is the palm shape, the feature data includes a length of each part of the palm, a shape of the palm contour, or the like. Further, in the case in which the biometric information is the palm vein, the feature data includes a vein pattern inside the palm.

The creating unit 235 creates the attribute information and the feature data together, as the registration data at the time of the registration, and as the authentication data at the time of authentication.

At the time of the registration, the storing unit 236 stores the registration data in a storage device, such as the memory 12, the auxiliary storage device 15, the portable recording medium 19, or the like illustrated in FIG. 1, for example. The storing unit 236 stores a plurality of registration data having a structure illustrated in FIG. 16, for example. FIG. 16 is a diagram illustrating an example of the structure of the registration data. The registration data illustrated in FIG. 16 includes the attribute information, and the feature data of the palm in correspondence with the attribute information. The attribute information includes an ID that is an example of identification information, and a user name of the user. FIG. 16 illustrates the registration data in which a feature data $H_1$ of the palm image is registered in correspondence with the attribute information including the ID that is "0001" and the user name that is "xxxx".

The matching unit 237 matches the feature data of the palm image within the registration data registered in the storage device, against the feature data of the palm image within the authentication data, and computes the similarity that is used to judge whether the authentication is successful. In the case in which the biometric information is the palm-print and the feature data of the palm image is the palm-print pattern, the matching unit 237 performs a pattern matching of the feature data of the palm images, for example, to compute the similarity. When the computed similarity is greater than or equal to the threshold value, the matching unit 237 judges that the authentication was successful, and outputs an authentication result indicating the successful authentication. On the other hand, when the computed similarity is less than the threshold value, the matching unit 237 judges that the authentication failed, and outputs an authentication result indicating the unsuccessful authentication (or failed authentication). The authentication result output from the matching unit 237 may be output to the message output unit 22. In this case, the message output unit 22 may display a message of the authentication result on the display device of the output device 14, output a voice message of the authentication result from the speaker of the output device 14, or the like.

According to the biometric authentication apparatus described above, it is possible to accurately judge the open or closed state of the palm, that is an example of the biometric state, not only in the case in which the entire palm is captured as illustrated in FIG. 9, but also in the case in which only a part of the palm is captured as illustrated in FIG. 10, to urge the user to reinput the biometric information appropriate for the authentication if the input biometric information is not appropriate for the authentication.

First Embodiment

Figure 17:
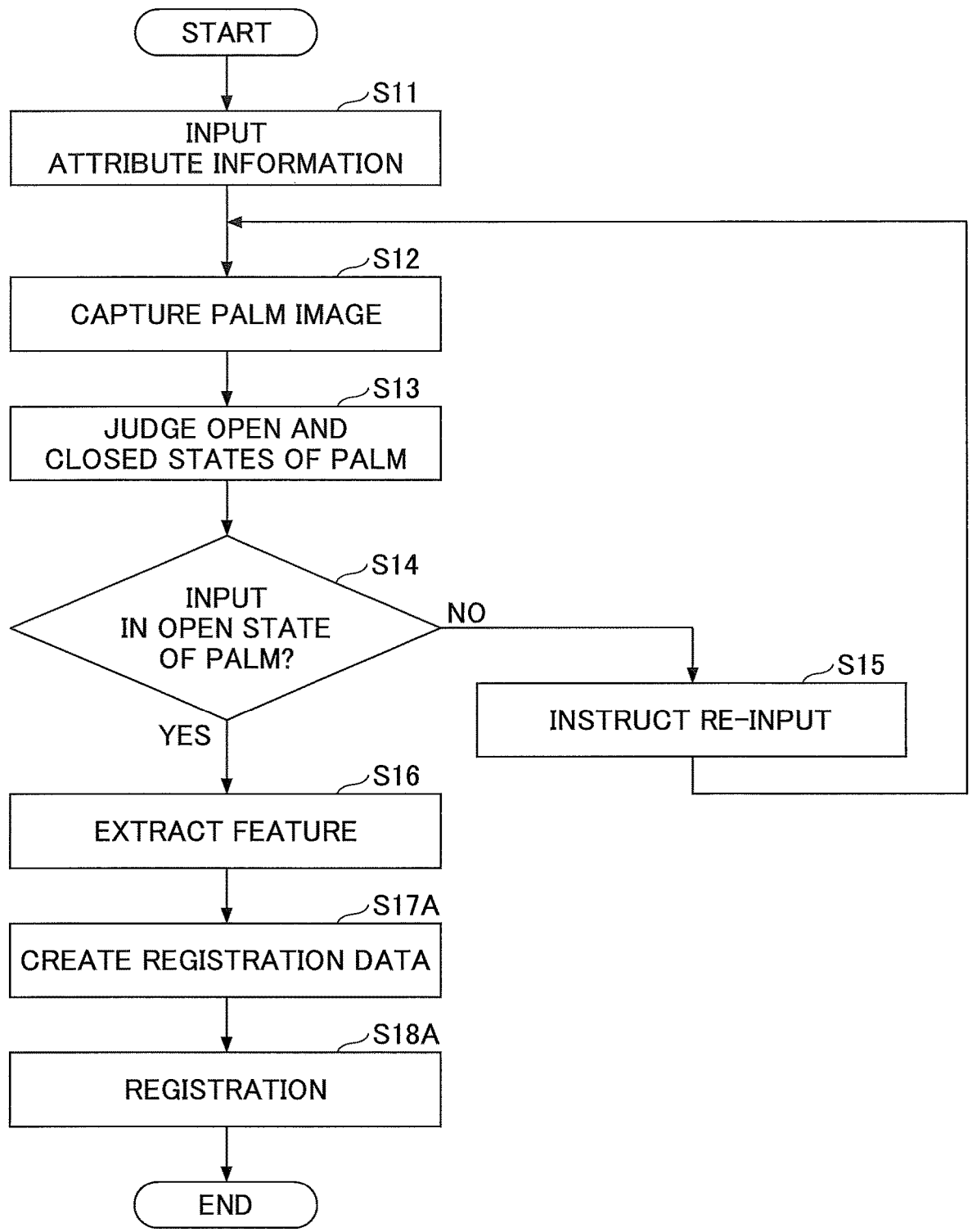
FIG. 17 is a flow chart for explaining an example of a registration process in a first embodiment.

FIG. 17 is a flow chart for explaining an example of a registration process in a first embodiment. In the registration process illustrated in FIG. 17, processes of steps S13 through S18B can be executed by the CPU 11 of the computer 1 illustrated in FIG. 1, or by the authentication unit 23 of the biometric authentication apparatus 2 illustrated in FIG. 8. In this first embodiment, the boundary candidate where the state of the biometric information changes, in the state in which the fingers are bent and the palm is closed, is the line information having the properties of the contour lines of the fingers located in front of the palm within the biometric information.

In step S11 illustrated in FIG. 17, the user operates the input device 13 of the computer 1 illustrated in FIG. 1, or the attribute information acquisition unit 21 of the biometric authentication apparatus 2 illustrated in FIG. 8, to input the attribute information of the user. In step S12, the user operates the input device 13 of the computer 1 illustrated in FIG. 1, or the biometric information acquisition unit 20 of the biometric authentication apparatus 2 illustrated in FIG. 8, to capture the user's palm and input the palm image.

In step S13, the CPU 11 or the authentication unit 23 judges the open or closed state of the palm, based on the input palm image. More particularly, the region extraction unit 231 extracts the boundary candidate where the state of the biometric information changes, and extracts the region in the vicinity of the boundary candidate and having the threshold area or greater, In addition, the state feature quantity extraction unit 232 extracts the state feature quantity having the value that changes according to the change in the state of the biometric information, from the extracted region. Further, the biometric state judgment unit 233 judges the open or closed state of the palm, that is an example of the biometric state, using the extracted state feature quantity.

In step S14, the CPU 11 or the authentication unit 23 (more particularly, the biometric state judgment unit 233) judges whether the palm image is the image input in the open state of the palm, from the open or closed state of the palm judged in step S13. The process advances to step S15 when the judgment result in step S14 is NO, and the process advances to step S16 when the judgment result in step S15 is YES.

In step S15, the CPU 11 or the authentication unit 23 (more particularly, the biometric state judgment unit 233) outputs the message urging the user to open the palm (that is, a message instructing the reinput in the open state of the palm), for example, from the output device 14 of the computer 1 or from the message output unit 22 of the biometric authentication apparatus 2. After step S15, the process returns to step S12, and in response to the message instructing the reinput, the user operates the input device 13 of the computer 1 or the biometric information acquisition unit 20 of the biometric authentication apparatus 2, to recapture the user's palm and reinput the palm image. As a result, the palm image appropriate for the authentication is reinput in the open state of the palm.

On the other hand, in step S16, the CPU 11 or the authentication unit 23 (more particularly, the feature data extraction unit 234) extracts the feature data of the palm image to be used for the matching.

In step S17A, the CPU 11 or the authentication unit 23 (more particularly, the creating unit 235) creates the attribute information and the feature data together, as the registration data. In step S18A, the CPU 11 or the authentication unit 23 (more particularly, the storing unit 236) performs the registration process to store the registration data in the storage device, such as the memory 12, the auxiliary storage device 15, the portable recording medium 19, or the like illustrated in FIG. 1, and the registration process ends.

Figure 18:
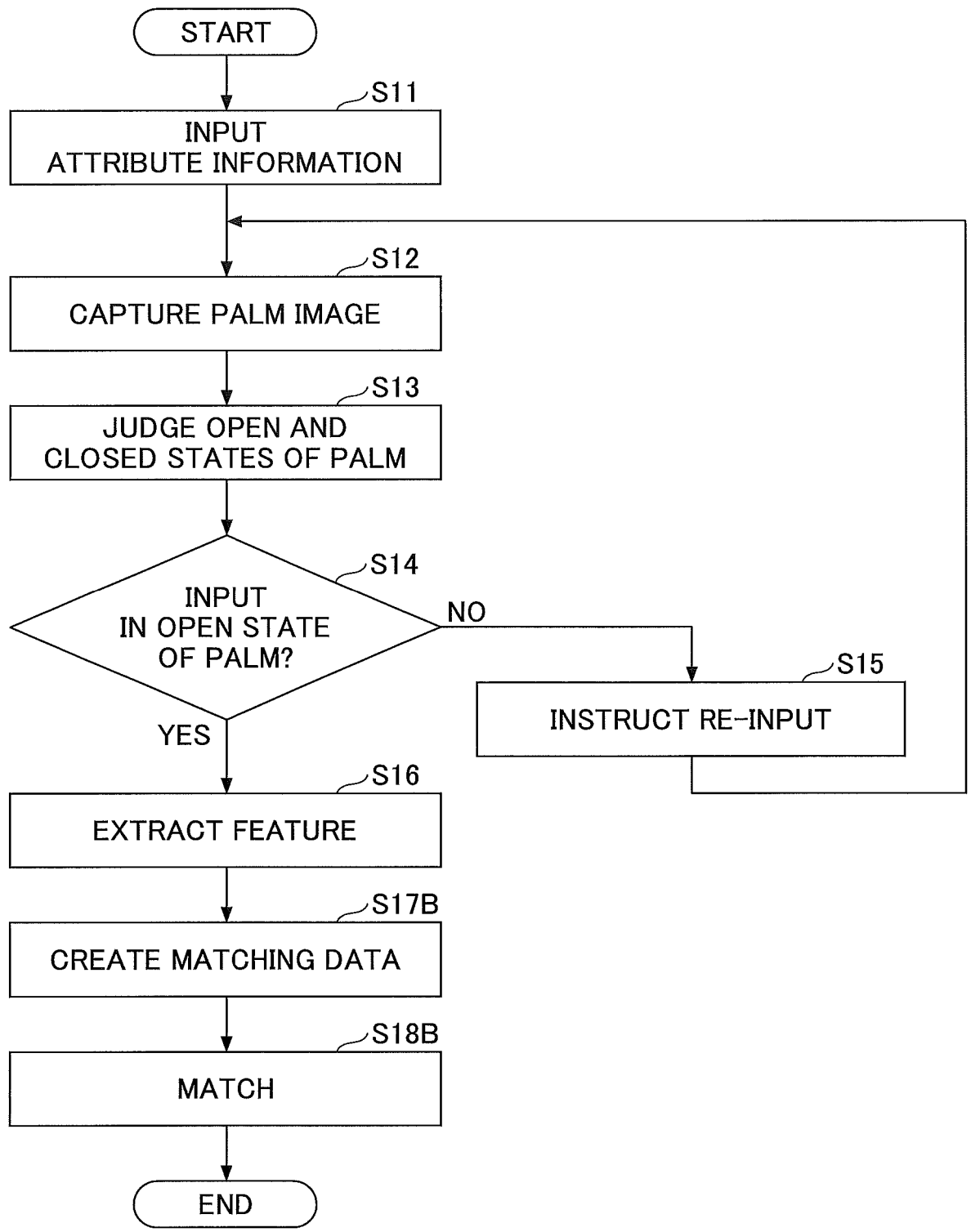
FIG. 18 is a flow chart for explaining an example of a biometric authentication process in the first embodiment.

FIG. 18 is a flow chart for explaining an example of a biometric authentication process in the first embodiment. The biometric authentication process illustrated in FIG. 18 can be executed by the CPU 11 of the computer 1 illustrated in FIG. 1, or by the authentication unit 23 of the biometric authentication apparatus 2 illustrated in FIG. 8. In FIG. 18, those steps that are the same as those corresponding steps in FIG. 17 are designated by the same reference numerals, and a description thereof will be omitted.

In step S17B illustrated in FIG. 18, the CPU 11 or the authentication unit 23 (more particularly, the creating unit 235) creates the attribute information and the feature data together, as the authentication data. In step S18B, the CPU 11 or the authentication unit 23 (more particularly, the matching unit 237) matches the feature data of the palm image within the registration data registered in the storage device against the feature data of the palm image within the authentication data, to compute the similarity that is used to judge whether the authentication is successful. Further, in step S18B, the CPU 11 or the authentication unit 23 (that is, the matching unit 237) outputs the authentication result indicating the successful authentication when the computed similarity is greater than or equal to the threshold value, and outputs the authentication result indicating the unsuccessful authentication (or failed authentication) when the computed similarity is less than the threshold value, and the biometric authentication process ends.

Figure 19:
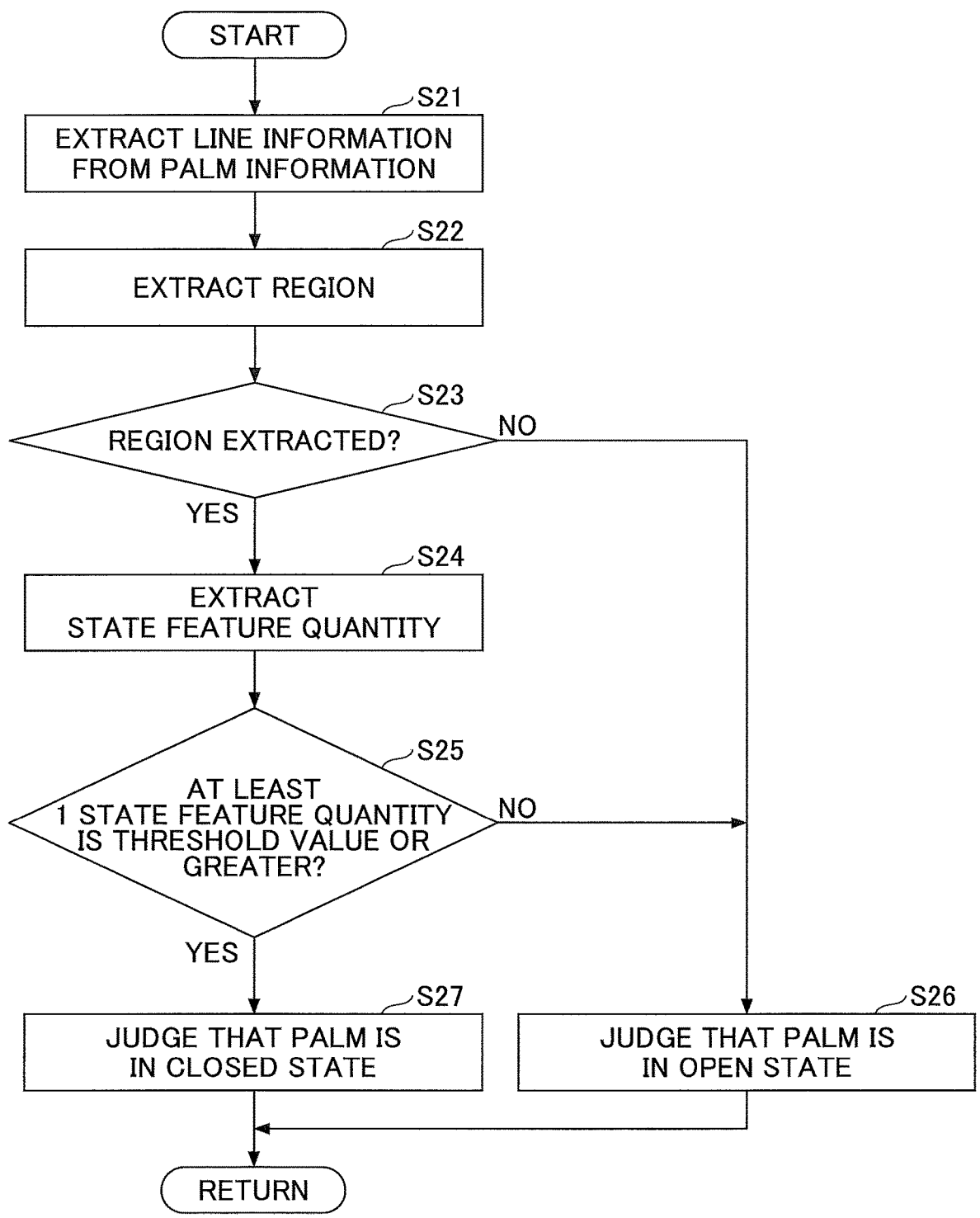
FIG. 19 is a flow chart for explaining, in more detail, an example of judging the open and closed states of the palm.

FIG. 19 is a flow chart for explaining, in more detail, an example of judging the open and closed states of the palm. The process illustrated in FIG. 19 can be executed by the CPU 11 of the computer 1 illustrated in FIG. 1, or by the authentication unit 23 of the biometric authentication apparatus 2 illustrated in FIG. 8. The process illustrated in FIG. 19 corresponds to the processes of steps S13 and S14 illustrated in FIGS. 17 and 18.

In step S21 illustrated in FIG. 19, the CPU 11 or the authentication unit 23 (that is, the region extraction unit 231) extracts the boundary candidate where the state of the biometric information changes. In this example, the boundary candidate where the state of the biometric information changes, in the state in which the fingers are bent and the palm is closed, is the line information having the properties of the contour lines of the fingers located in front of the palm within the biometric information. In step S22, the CPU 11 or the authentication unit 23 (that is, the region extraction unit 231) extracts the region in the vicinity of the boundary candidate and having the threshold area or greater. In step S23, the CPU 11 or the authentication unit 23 (that is, the region extraction unit 231) judges whether the region is extracted. The process advances to step S26 that will be described later when the judgment result in step S23 is NO, and the process advances to step S24 when the judgment result in step S23 is YES.

In step S24, the CPU 11 or the authentication unit 23 (that is, the state feature quantity extraction unit 233) extracts the state feature quantity having the value that changes according to the change in the state of the biometric information, from the extracted region. In this example, the state feature quantity is the information indicating the differences in the biometric features of the skin on the palm side and the skin on the back side of the fingers. In step S25, the CPU 11 or the authentication unit 23 (that is, the state feature quantity extraction unit 232) judges whether at least one or more state feature quantities greater than or equal to the threshold value exist. The process advances to step S26 when the judgment result in step S25 is NO, and the process advances to step S27 when the judgment result in step S25 is YES.

In step S26, the CPU 11 or the authentication unit 23 (that is, the biometric state judgment unit 233) uses the extracted state feature quantity and judges that the palm is in the open state, and the process advances to step S16 illustrated in FIG. 17 or FIG. 18. On the other hand, in step S27, the CPU 11 or the authentication unit 23 (that is, the biometric state judgment unit 233) uses the extracted state feature quantity and judges that the palm is in the closed state, and the process advances to step S15 illustrated in FIG. 17 or FIG. 18.

FIGS. 17 and 18 illustrate the processes for a case in which the computer 1 illustrated in FIG. 1 or the biometric authentication apparatus 2 illustrated in FIG. 8 is a stand-alone terminal. However, the processes illustrated in FIGS. 17 and 18 are also applicable to a client-server system. In other words, the processes illustrated in FIGS. 17 and 18 may be executed by a client and a server of the client-server system by distributed processing. The client of the client-server system may have a configuration similar to that of the computer 1 illustrated in FIG. 1 or the biometric authentication apparatus 2 illustrated in FIG. 8, for example. In addition, the server of the client-server system may have a configuration similar to that of the computer 1 illustrated in FIG. 1 or the biometric authentication apparatus 2 illustrated in FIG. 8, for example. The client and the server of the client-server system may be communicably connected via one or more networks, for example.

Figure 20:
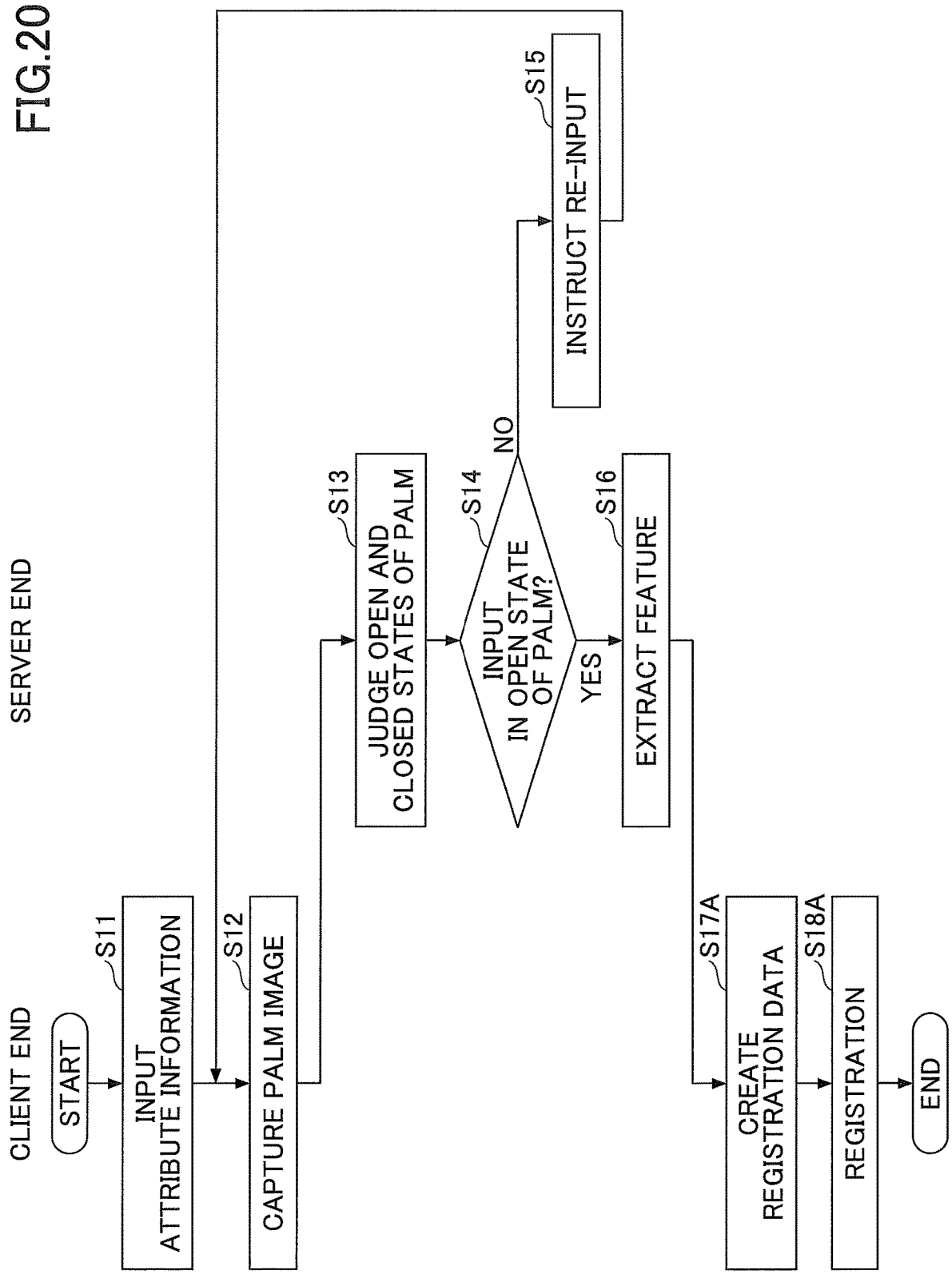
FIG. 20 is a flow chart for explaining an example of the registration process in a client-server system.
Figure 21:
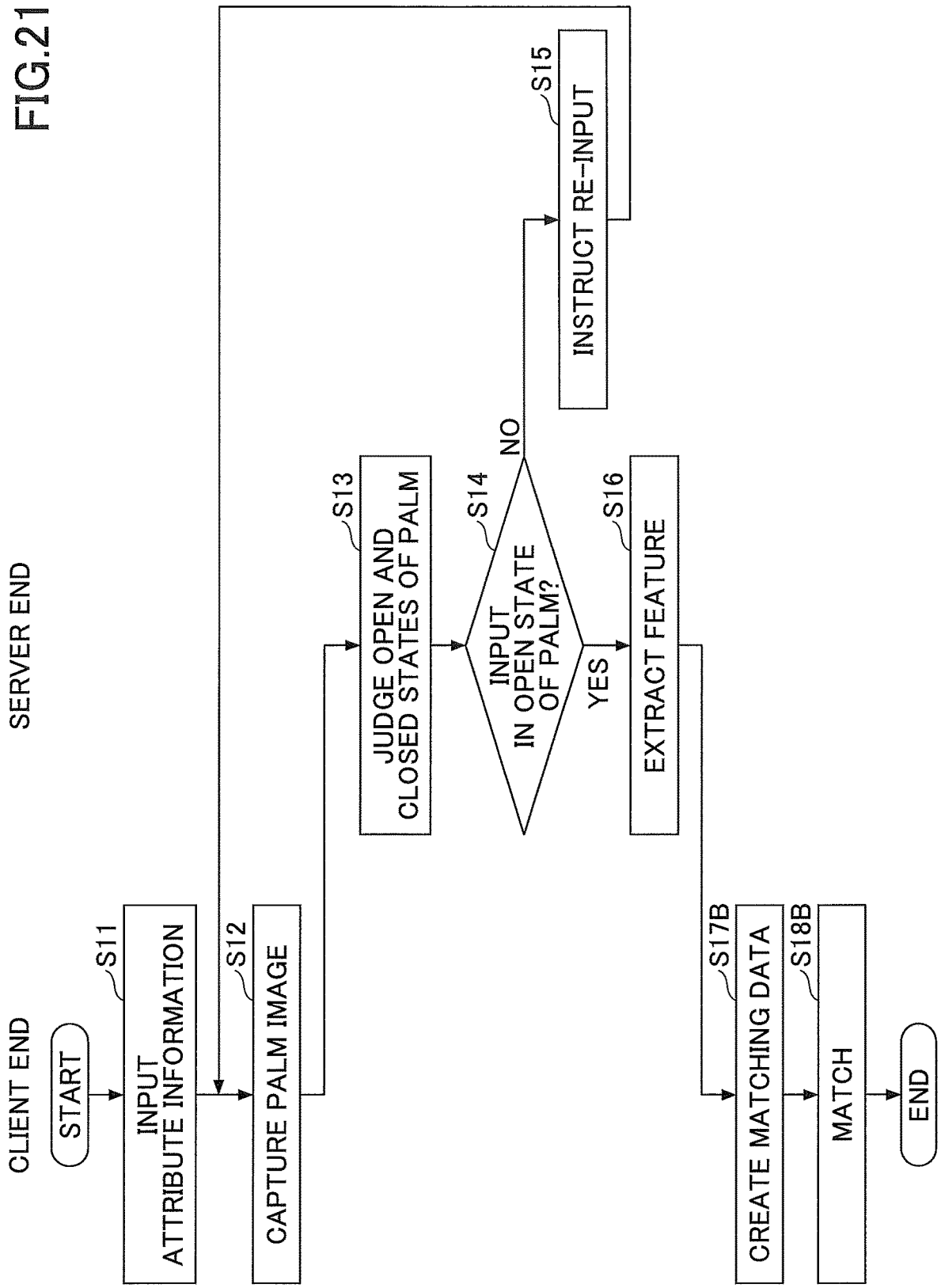
FIG. 21 is a flow chart for explaining an example of the biometric authentication process in the client-server system.

In the case of the client-server system at the time of the registration, the processes of steps S13 through S16 illustrated in FIG. 17 may be executed by the server, and the processes of steps S11, S12, S17A, and S18A illustrated in FIG. 17 may be executed by the client, as illustrated in FIG. 20. In addition, in the case of the client-server system at the time of the authentication, the processes of steps S13 through S16 illustrated in FIG. 18 may be executed by the server, and the processes of steps S11, S12, S17B, and S18B may be executed by the client, as illustrated in FIG. 21. In FIGS. 20 and 21, those steps that are the same as those corresponding steps in FIGS. 17 and 18, respectively, are designated by the same reference numerals, and a description thereof will be omitted.

When the processes of steps S11 and S12 in FIGS. 20 and 21 are executed by the client, the attribute information and the palm image that are input at the client end is sent to the server via the network connection device 17 of the computer 1 forming the client. On the other hand, when the processes of steps S13 and S14 are executed by the server and the judgment result in step S14 is YES, the process of step S16 is executed by the server, and the feature data of the palm image used for the matching is extracted and sent to the client via the network connection device 17 of the computer 1 forming the server. In addition, when the judgment result in step S14 is NO, the process of step S15 is executed by the server, and the message urging the user to open the palm and reinput the palm image is sent to the client via the network connection device 17 of the computer 1 forming the server. In this case, it is possible to reduce the load of the processes on the client, by executing the processes of steps S13 through S16, that are relatively complex and require a relatively long processing time, by the server.

Figure 22:
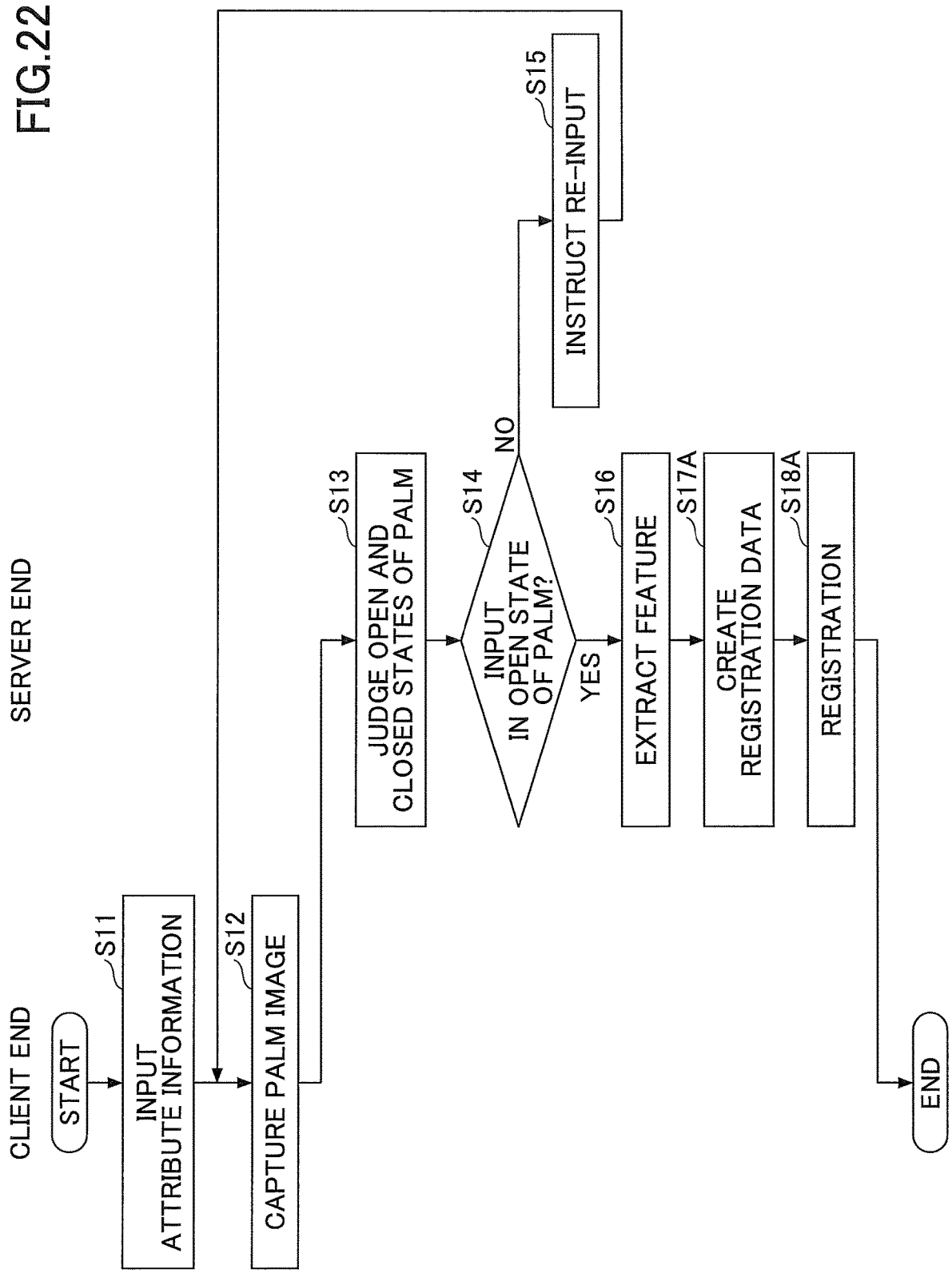
FIG. 22 is a flow chart for explaining another example of the registration process in the client-server system.
Figure 23:
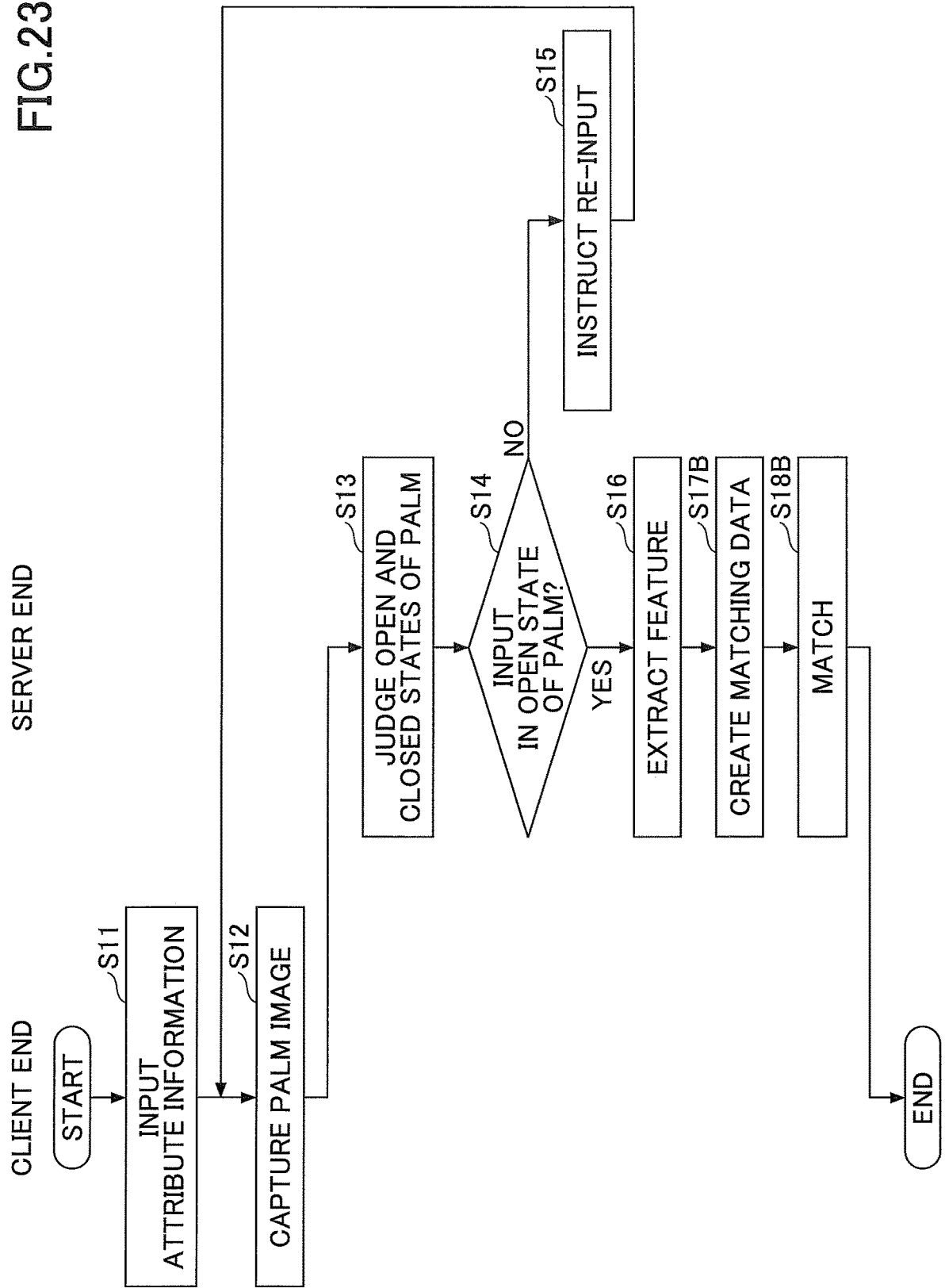
FIG. 23 is a flow chart for explaining another example of the biometric authentication process in the client-server system.

At the time of the registration, the processes of steps S17A and S18A illustrated in FIG. 17 may be executed by the server, as illustrated in FIG. 22. In addition, at the time of the authentication, the processes of steps S17B and S18B illustrated in FIG. 18 may be executed by the server, as illustrated in FIG. 23. In FIGS. 22 and 23, those steps that are the same as those corresponding steps in FIGS. 17 and 18, respectively, are designated by the same reference numerals, and a description thereof will be omitted.

In the case of the process illustrated in FIG. 22, the registration data created in step S17A illustrated in FIG. 17 is registered in the storage device of the server in step S18A. In addition, in the case of the process illustrated in FIG. 23, the authentication data created in step S17B illustrated in FIG. 18 is matched against the registration data registered in the storage device of the server, and the result of the matching is sent to the client via the network connection device 17 of the computer 1 forming the server, in step S18B. In this case, it is possible to further reduce the load of the processes on the client, by executing the processes of steps S13 through S16, S17A, and S18A illustrated in FIG. 17 by the server as illustrated in FIG. 22, or by executing the processes of steps S13 through S16, S17B, and S18B illustrated in FIG. 18 by the server as illustrated in FIG. 23.

According to the first embodiment, it is possible to accurately judge the open or closed state of the palm, that is an example of the biometric state, according to the contour lines of the fingers within the palm image, not only in the case in which the entire palm is captured as illustrated in FIG. 9, but also in the case in which only a part of the palm is captured as illustrated in FIG. 10, to urge the user to reinput the biometric information appropriate for the authentication if the input biometric information is not appropriate for the authentication.

Second Embodiment

Figure 24:
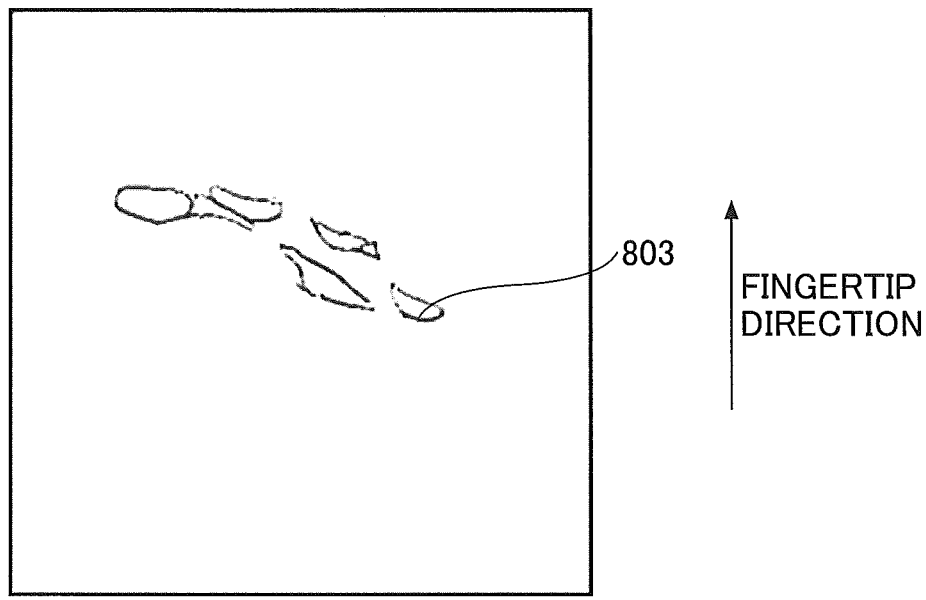
FIG. 24 is a diagram illustrating an example of contour lines of nails extracted by the region extraction unit in a second embodiment.

Next, a description will be given of a second embodiment, by referring to FIG. 24. FIG. 24 is a diagram illustrating an example of the contour lines of nails extracted by the region extraction unit in the second embodiment. In this second embodiment, the boundary candidate where the state of the biometric information changes, in the state in which the fingers are bent and the palm is closed, is the line information having the properties of the contour lines of the nails located in front of the palm within the biometric information. In this second embodiment, processes other than the process of judging the open or closed state of the palm according to the existence (or non-existence) of the nails within the input palm image, may be the same as the corresponding processes of the first embodiment described above. In other words, details of the processes of steps S13 and S14 illustrated in FIGS. 17 and 18 in this second embodiment are different from those corresponding processes of the first embodiment described above. In this second embodiment, the computer 1 illustrated in FIG. 1 or the biometric authentication apparatus 2 illustrated in FIG. 8 may be a stand-alone terminal, or a client of a client-server system, similarly as in the case of the first embodiment described above. In the case in which the processes illustrated in FIGS. 17 and 18 are applied to the client-server system, a part of the registration process and the biometric authentication process may be executed by the server of the client-server system, as illustrated in FIGS. 21 and 22 or FIGS. 23 and 24.

In the palm image that is input in the open state of the palm, no nails exist unless the nails are extremely long. On the other hand, in the palm image that is input in the closed state of the palm, the nails exist. Hence, in this second embodiment, information related to the existence (or non-existence) of the nails located in front of the palm within the biometric information, in the state in which the fingers are bent and the palm is closed, is used as the state feature quantity.

In a case in which the palm image is a color image, the region extraction unit 231 may separate the palm image into a region corresponding to a preset color gamut of the palm and a region corresponding to other than the preset color gamut of the palm, and extract the region corresponding to other than the preset color gamut of the palm. In order to determine the color gamut with a high accuracy, it is possible to create a classifier by machine learning, such as a SVM (Support Vector Machine). For example, images of the palm, the nails, and the nail color may be collected in advance to create a database thereof. Thereafter, the classifier may be created by supervised machine learning that classifies the color gamut of the palm and the color gamut of the nails and the nail color. The region extraction unit 231 may extract the region other than the color gamut of the palm, using the classifier that is created in this manner.

In addition, in a case in which the palm image is a monochromatic image, the region extraction unit 231 may extract the line information, such as the palm-print, the palm shape, the palm vein, or the like from the palm image, using an edge extraction filter, such as a Sobel filter, or the like. In the case in which the nails exist within the palm image, a closed curve surrounding a part of the region exists as the contour lines 803 of the nails, as illustrated in FIG. 12. The region extraction unit 231 may extract the closed curve by thinning the line information as illustrated in FIG. 24, to extract the closed curve as the boundary candidate. In addition, the region extraction unit 231 may extract the region surrounded by the boundary candidate.

Next, the state feature quantity extraction unit 232 extracts the area of the region or the number of regions, as the state feature quantity, from the image of the extracted region.

The biometric state judgment unit 233 uses the state feature quantity of the extracted region to judge the state of the biometric information. In the case in which the state feature quantity is the area of the extracted region, the threshold value may be an area approximately corresponding to 2% to 20% of the area of the palm image, for example. In the case in which the state feature quantity is the number of the extracted regions, the threshold value may be a number approximately corresponding to 1 to 5, for example.

Accordingly, in this second embodiment, the line information that is an example of the boundary candidate where the state of the biometric information changes, and is used in the processes of steps S21 through S27 illustrated in FIG.

19, is the line information having the properties of the contour lines of the nails located in front of the palm within the biometric information, in the state in which the fingers are bent and the palm is in the closed state.

According to this second embodiment, it is possible to accurately judge the open or closed state of the palm, that is an example of the biometric state, according to the contour lines of the nails within the palm image, not only in the case in which the entire palm is captured as illustrated in FIG. 9, but also in the case in which only a part of the palm is captured as illustrated in FIG. 10, to urge the user to reinput the biometric information appropriate for the authentication if the input biometric information is not appropriate for the authentication.

Third Embodiment

Figure 25:
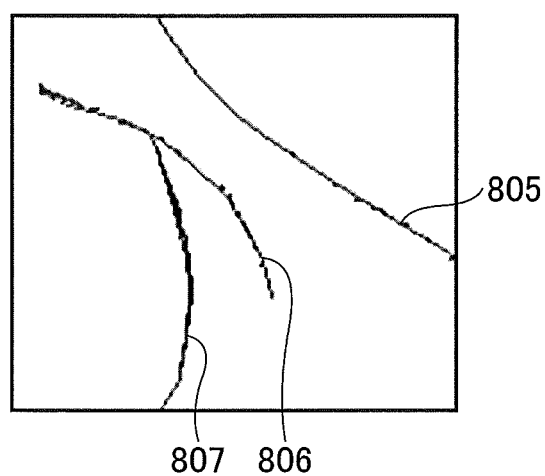
FIG. 25 is a diagram illustrating an example of a heart line, a head line, and a life line extracted as boundary candidates by the region extraction unit in a third embodiment.

Next, a description will be given of a third embodiment, by referring to FIGS. 25 through 28. FIG. 25 is a diagram illustrating an example of the heart line, the head line, and the life line extracted as the boundary candidates by the region extraction unit in the third embodiment. In this third embodiment, the boundary candidate where the state of the biometric information changes, in the state in which the fingers are bent and the palm is closed, is the line information having the properties of the heart line, the head line, the life line, or the like existing on the palm within the biometric information. In this third embodiment, the biometric state judgment unit 233 is an example of a judgment unit that judges the closed state of the palm in which the fingers are in an excessively bent state, and the open state of the palm in which the entire palm is flat and the fingers are not bent. When an absolute value of a difference of state feature quantities within different regions is greater than or equal to a threshold value, the biometric state judgment unit 233 judges that a difference of distances between parts of the palm in ranges of these regions and the sensor of the biometric information acquisition unit 20 is greater than or equal to a predetermined value and large, and that the fingers are in the excessively bent state. On the other hand, when the absolute value is less than the threshold value, the biometric state judgment unit 233 judges that the above described difference of the distances is less than the predetermined value and small, and that the fingers are not in the bent state and the entire palm is flat. The excessively bent state of the fingers refers to the closed state of the palm, where the line information, such as the heart line, the head line, the life line, or the like used for the registration process or the biometric authentication process cannot be extracted sufficiently from the palm image acquired by the sensor of the biometric information acquisition unit 20. On the other hand, the state in which the entire palm is flat and the fingers are not bent refers to the open state of the palm, where the line information, such as the heart line, the head line, the life line, or the like used for the registration process or the biometric authentication process can be extracted sufficiently from the palm image acquired by the sensor of the biometric information acquisition unit 20.

In this third embodiment, processes other than the process of judging the open or closed state of the palm according to the bent extent of the fingers within the input palm image, may be the same as the corresponding processes of the first or second embodiment described above. In other words, details of the processes of steps S13 and S14 illustrated in FIGS. 17 and 18 in this third embodiment are different from those corresponding processes of the first or second embodiment described above. In this third embodiment, the computer 1 illustrated in FIG. 1 or the biometric authentication apparatus 2 illustrated in FIG. 8 may be a stand-alone terminal, or a client of a client-server system, similarly as in the case of the first or second embodiment described above. In the case in which the processes illustrated in FIGS. 17 and 18 are applied to the client-server system, a part of the registration process and the biometric authentication process may be executed by the server of the client-server system, as illustrated in FIGS. 21 and 22 or FIGS. 23 and 24.

The heart line, the head line, the life line, or the like of the palm can be used as a reference line when bending and extending the fingers. When the reference line is regarded as the boundary candidate and a peripheral region bounded by the boundary candidate is extracted, it is possible to judge the extent of the bending and extending of the fingers, based on the differences in the state feature quantities of the plurality of regions.

For example, the region extraction unit 231 extracts the line information similarly to the first or second embodiment described above, judges from among the line information the line information having a length greater than or equal to the threshold value as the candidate of a heart line 805, a head line 806, or a life line 807, and extracts the boundary candidate as illustrated in FIG. 25. Because the heart line 805, the head line 806, and the life line 807 have lengths corresponding to a horizontal width or a vertical width of the palm, the threshold value may be set approximately to a length of 2 cm to 10 cm, for example. In the case in which the palm image is a partial image of the palm, the heart line 805, the head line 806, or the life line 807 can be judged as a line horizontally or vertically traversing a majority of the regions within the palm image, and thus, the threshold value may be set approximately to a length that is 80% to 90% of the horizontal or vertical width of the palm image, for example.

Figure 26:
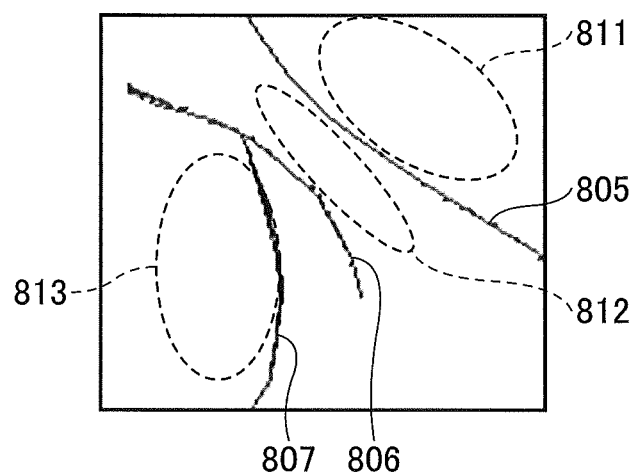
FIG. 26 is a diagram illustrating an example of regions extracted by the region extraction unit in the third embodiment.

Further, the region extraction unit 231 extracts regions having various shapes, such as a rectangular shape, a polygonal shape, a circular shape, an oval shape, or he like, having the boundary candidate as a part of the boundary line, as illustrated in FIG. 26. FIG. 26 is a diagram illustrating an example of the regions extracted by the region extraction unit in the third embodiment. In this example, the region extraction unit 231 extracts a region 811 within a dotted line located on the fingertip side of the heart line 805, a region 812 within the dotted line located between the heart line 805 and the head line 806, and a region 813 within a dotted line located on a wrist side of the life line 807. In addition, each of the regions 811, 812, and 813 has the oval shape in the example illustrated in FIG. 26. In the case in which the partial image of the palm is used as the biometric information, the following processes are performed when 2 or more regions can be extracted.

The state feature quantity extraction unit 232 extracts, as the state feature quantity, the inclination of the palm from the horizontal state, information that changes according to the distance between the part of the palm in the range of the region and the sensor of the biometric information acquisition unit 20, or the like. The horizontal state of the palm includes a state in which the palm is parallel to a guide member, for example, a state in which the palm is perpendicular to an optical axis of the sensor of the biometric information acquisition unit 20, or the like. The state feature quantity extraction unit 232 extracts, as the state feature quantity, an average value of luminance values of the pixels within the region, for example. In the case in which the palm image is a color image, the state feature quantity extraction unit 232 extracts, as the state feature quantity, the average value of the luminance values obtained by converting the color image into a monochromatic image.

In the state in which the palm of the hand is horizontal and a thumb and other fingers of the same hand are not bent, the distance between the part of the palm in the range of the region and the sensor of the biometric information acquisition unit 20 is approximately the same for each region. Hence, a distribution of the luminance values becomes approximately the same for each region, and a difference between the state feature quantities of the regions has a tendency to become less than a predetermined value and small.

Figure 27:
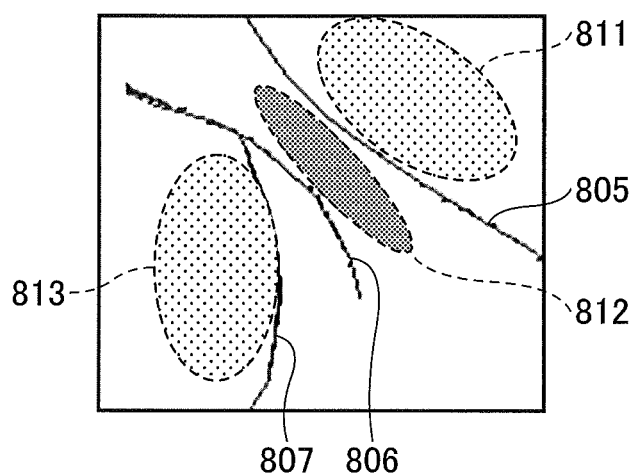
FIG. 27 is a diagram illustrating an example of luminance values of regions in a case in which fingers are in excessively bent states in the third embodiment.

On the other hand, in the state in which the palm of the hand is horizontal and the thumb and other fingers of the same hand are excessively bent, the distance between the part of the palm in the range of the region 812, located between the heart line 805 and the head line 806 and indicated by a dark halftone, and the sensor, is long compared to the distance between the part of the palm in the range of each of the regions 811 and 813 indicated by a light halftone and the sensor, as illustrated in FIG. 27. In addition, the luminance value of the region 812 is low compared to the luminance value of each of the regions 811 and 813. In other words, the distance between the part of the palm in the range of the region 811, located on the fingertip side of the heart line 805 and indicated by the light halftone, and the sensor, and also the distance between the part of the palm in the range of the region 813, located on the wrist side of the life line 807 and indicated by the light halftone, and the sensor, are short compared to the distance between the part of the palm in the range of the region 812 and the sensor. Further, the luminance values of the regions 811 and 813 are high compared to the luminance value of the region 812. As a result, the regions 811 and 813 indicated by the light halftone in which the luminance value is greater than or equal to a predetermined value, and the region 812 indicated by the dark halftone in which the luminance value is less than the predetermined value, coexist in the region extracted by the region extraction unit 231, as illustrated in FIG. 27. Moreover, between the region 811 or 813 and the region 812, the difference between the state feature quantities has a tendency to become greater than or equal to the predetermined value and large. FIG. 27 is a diagram illustrating an example of the luminance values of the regions in the case in which fingers are in excessively bent states in the third embodiment.

The biometric state judgment unit 233 judges that the thumb and the other fingers of the same hand are in the excessively bent states (that is, the entire palm is not flat), when an absolute value of the difference of the state feature quantities within different regions is greater than or equal to a threshold value and a difference of the inclinations within the difference regions is greater than or equal to a predetermined value. In this case, this third embodiment outputs a message urging the user to input the palm image in a state in which the fingers are not excessively bent, so that the user may perform the process of reinputting the palm image.

The biometric state judgment unit 233 judges that the thumb and the other fingers of the same hand are not in the bent states and the entire palm is flat, when the absolute value of the difference of the state feature quantities within the different regions is less than the threshold value and the difference of the inclinations within the difference regions is less than the predetermined value. In a case in which the luminance values of the palm image are in a range of 0 to 255, for example, the threshold value may be set approximately to a value in a range that is 10% to 60% of the luminance values within this range.

In this third embodiment, the line information that is an example of the boundary candidate where the state of the biometric information changes, and is used in the processes of steps S21 through S27 illustrated in FIG. 19, is the line information having the properties of the heart line, the head line, and the life line existing on the palm, in the state in which the fingers are bent and the palm is in the closed state.

According to this third embodiment, it is possible to accurately judge the open or closed state of the palm, that is an example of the biometric state, by accurately judging the bent extent of the fingers, not only in the case in which the entire palm is captured as illustrated in FIG. 9, but also in the case in which only a part of the palm is captured as illustrated in FIG. 10, to urge the user to reinput the biometric information appropriate for the authentication if the input biometric information is not appropriate for the authentication.

Figure 28:
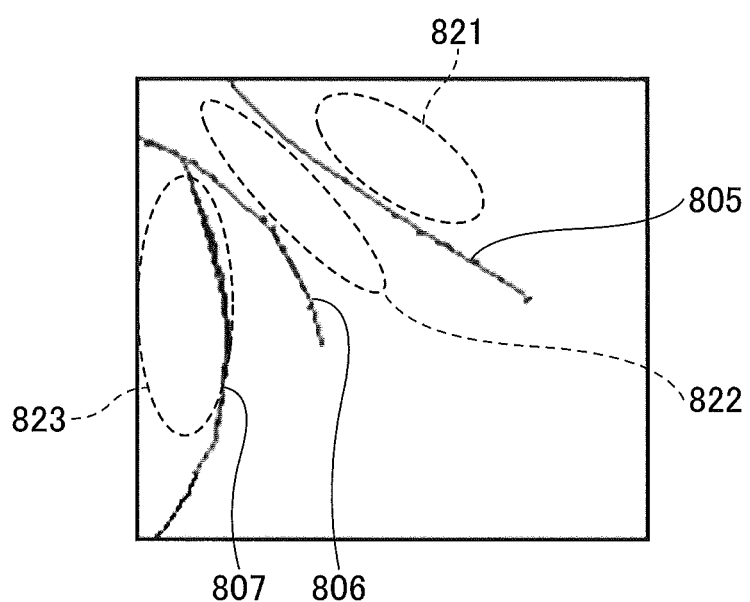
FIG. 28 is a diagram illustrating an example of regions extracted in a case in which a capture area of the palm image is misaligned in the third embodiment.

In addition, even in a case in which a misalignment of the capture area of the palm image captured by the biometric information acquisition unit 20 occurs as illustrated in FIG. 28, the region extraction unit 231 can accurately judge the bent extent of the fingers, by extracting the regions using the heart line 805 or the line as a reference, to absorb the misalignment of the capture area of the palm image. FIG. 28 is a diagram illustrating an example of the regions extracted in the case in which the capture area of the palm image is misaligned in the third embodiment. In this example, the region extraction unit 231 extracts a region 821 within a dotted line located on the fingertip side of the heart lie 805, a region 822 within a dotted line between the heart line 805 and the head line 806, and a region 823 within a dotted line on the wrist side of the life line 807.

According to each of the embodiments described above, it is possible to accurately judge the open and closed states of the palm, as an example of the biometric state. The open and closed states of the palm can be accurately detected even in the case in which only a part of the palm and not the entire palm is captured due to a narrow angle of view of the camera or the like, and the case in which the number of kinds of registration data of the images that are registered in advance is limited. In addition, in the case in which it is judged that the palm image is input in the closed state of the palm as a result of judging the open and closed states of the palm, a message is output to urge the user to open the palm and input the palm image. Hence, it is possible to urge the user to input the palm image, that is an example of the biometric information, appropriate for the authentication. Further, by urging the user to open the palm, it is possible to improve the authentication accuracy and reduce the erroneous authentication, to reduce the false rejection rate.

Each of the embodiments is described above for the case in which the biometric information used for the biometric authentication is the palm image. However, the biometric information is not limited to the palm image, and the biometric information may be an image of veins of the fingers (hereinafter also referred to as "a finger vein image"), for example. In the case of the finger vein image, it is possible to accurately judge the extent of the bending and extending of the fingers, similarly to the judging of the open and closed states of the palm. In the case of the finger vein image, the state feature quantity includes information indicating differences in biometric features of the skin at the palm side (that is, the side containing the fingerprints) and at the back of the fingers (that is, the side containing the nails) of the hand. In this case, the boundary where the state of the biometric information changes is the line information having the properties of the wrinkles or the like that are generated in the bent state of the fingers, for example. In addition, in a case in which it is judged that the finger vein image is input in the bent state of the fingers as a result of judging the extent of the bending and extending of the fingers, a message is output to urge the user to input the finger vein image by extending the fingers. Hence, it is possible to urge the user to input the finger vein image, that is an example of the biometric information, appropriate for the authentication. Further, by urging the user to extend the fingers, it is possible to improve the authentication accuracy and reduce the erroneous authentication, to reduce the false rejection rate.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication apparatus comprising:
   a memory configured to store a program and registration data; and
   a processor configured to execute the program to perform a process including
      acquiring a palm image of a palm of a hand of a user from a capturing device;
      extracting a boundary candidate, related to line information of the hand, where an open or closed state of the palm changes, to extract a region in a vicinity of the boundary candidate and having a threshold area or greater, wherein the boundary candidate is one of
         first line information having properties of contour lines of fingers or nails of the hand, located in front of the palm in a state in which the fingers are bent and the palm is closed, and
         second line information having properties of one of a heart line, a head line, and a life line existing on the palm;
      extracting a state feature quantity having a value that changes according to a change in the open or closed state of the palm, from the extracted region, wherein the state feature quantity includes one of
         information indicating differences in biometric features of skin at the palm and at a back of the fingers of the hand when the boundary candidate is the first line information, and
         information that changes according to an inclination of the palm from a horizontal state or according to a distance between a part of the palm in a range of the region and the capturing device when the boundary candidate is the second line information;
      judging the open or closed state of the palm using the state feature quantity of the extracted region, wherein the judging judges the closed state of the palm when at least one state feature quantity greater than or equal to a threshold value exists, and judges the open state of the palm when only state feature quantities less than the threshold value exist; and
      matching the palm image against the registration data registered in advance in the memory when the judging judges the open state of the palm, to verify an identity of the user as the user who registered the registration data in advance, when the palm image and the registration data match.

2. The biometric authentication apparatus as claimed in claim 1, wherein the extracting the boundary candidate extracts a region surrounded by a plurality of boundary candidates when the plurality of boundary candidates are extracted.

3. The biometric authentication apparatus as claimed in claim 1, wherein the state feature quantity further includes line information having components extending perpendicularly to a fingertip direction.

4. The biometric authentication apparatus as claimed in claim 1, wherein the judging judges that the palm is in the closed state when an absolute value of a difference of state feature quantities within different regions is greater than or equal to a predetermined threshold value, and judges that the palm is in the open state when the absolute value is less than the predetermined threshold value.

5. The biometric authentication apparatus as claimed in claim 1,
   wherein the judging outputs, to an output device, a message urging the user to open the palm when the judging judges that the palm is in the closed state.

6. The biometric authentication apparatus as claimed in claim 1, wherein the process further includes
   acquiring attribute information of the user, used to verify the identity of the user, at a time of registration when the registration data of the biometric information is registered, or at a time of authentication when the user is authenticated.

7. A biometric authentication method comprising:
   acquiring, by a capturing device, a palm image of a palm of a hand of a user;
   extracting, by a computer, a boundary candidate, related to line information of the hand, where an open or closed state of the palm changes, to extract a region in a vicinity of the boundary candidate and having a threshold area or greater, wherein the boundary candidate is one of
      first line information having properties of contour lines of fingers or nails of the hand, located in front of the palm in a state in which the fingers are bent and the palm is closed, and
      second line information having properties of one of a heart line, a head line, and a life line existing on the palm;
   extracting, by the computer, a state feature quantity having a value that changes according to a change in the open or closed state of the palm, from the extracted region, wherein the state feature quantity includes one of information indicating differences in biometric features of skin at the palm and at a back of the fingers of the hand when the boundary candidate is the first line information, and information that changes according to an inclination of the palm from a horizontal state or according to a distance between a part of the palm in a range of the region and the capturing device when the boundary candidate is the second line information;

judging, by the computer, the open or closed state of the palm using the state feature quantity of the extracted region, wherein the judging judges the closed state of the palm when at least one state feature quantity greater than or equal to a threshold value exists, and judges the open state of the palm when only state feature quantities less than the threshold value exist; and matching, by the computer, the palm image against registration data registered in advance in a memory when the judging judges the open state of the palm, to verify an identity of the user as the user who registered the registration data in advance, when the palm image and the registration data match.

8. The biometric authentication method as claimed in claim 7, wherein the extracting the boundary candidate extracts a region surrounded by a plurality of boundary candidates when the plurality of boundary candidates are extracted.

9. A non-transitory computer-readable storage medium having stored therein a program for causing a computer to execute a process comprising:

acquiring a palm image of a palm of a hand of a user from a capturing device;

extracting a boundary candidate, related to line information of the hand, where an open or closed state of the palm changes, to extract a region in a vicinity of the boundary candidate and having a threshold area or greater, wherein the boundary candidate is one of first line information having properties of contour lines of fingers or nails of the hand, located in front of the palm in a state in which the fingers are bent and the palm is closed, and second line information having properties of one of a heart line, a head line, and a life line existing on the palm;

extracting a state feature quantity having a value that changes according to a change in the open or closed state of the palm, from the extracted region, wherein the state feature quantity includes one of information indicating differences in biometric features of skin at the palm and at a back of the fingers of the hand when the boundary candidate is the first line information, and information that changes according to an inclination of the palm from a horizontal state or according to a distance between a part of the palm in a range of the region and the capturing device when the boundary candidate is the second line information;

judging the open or closed state of the palm using the state feature quantity of the extracted region, wherein the judging judges the closed state of the palm when at least one state feature quantity greater than or equal to a threshold value exists, and judges the open state of the palm when only state feature quantities less than the threshold value exist; and matching the palm image against registration data registered in advance in a memory when the judging judges the open state of the palm, to verify an identity of the user as the user who registered the registration data in advance, when the palm image and the registration data match.

10. The non-transitory computer-readable storage medium as claimed in claim 9, wherein the extracting the boundary candidate extracts a region surrounded by a plurality of boundary candidates when the plurality of boundary candidates are extracted.

11. The biometric authentication method as claimed in claim 7, wherein the judging outputs, to an output device, a message urging the user to open the palm when the judging judges that the palm is in the closed state.

12. The biometric authentication method as claimed in claim 7, further comprising:

acquiring, by the computer, attribute information of the user, used to verify the identity of the user, at a time of registration when the registration data of the biometric information is registered, or at a time of authentication when the user is authenticated.

13. The non-transitory computer-readable storage medium as claimed in claim 9, wherein the judging outputs, to an output device, a message urging the user to open the palm when the judging judges that the palm is in the closed state.

14. The non-transitory computer-readable storage medium as claimed in claim 9, the process further comprising:

acquiring attribute information of the user, used to verify the identity of the user, at a time of registration when the registration data of the biometric information is registered, or at a time of authentication when the user is authenticated.

* * * * *